United States Patent
Saki et al.

(10) Patent No.: US 10,114,365 B2
(45) Date of Patent: *Oct. 30, 2018

(54) ANALYSIS DEVICE, ANALYSIS METHOD, AND PROGRAM

(71) Applicant: Yazaki Corporation, Minato-ku, Tokyo (JP)

(72) Inventors: Yasuhiro Saki, Makinohara (JP); Yuya Saito, Makinohara (JP)

(73) Assignee: Yazaki Corporation, Minato-ku, Tokyo (JP)

(*) Notice: Subject to any disclaimer, the term of this patent is extended or adjusted under 35 U.S.C. 154(b) by 269 days.

This patent is subject to a terminal disclaimer.

(21) Appl. No.: 14/990,921

(22) Filed: Jan. 8, 2016

(65) Prior Publication Data

US 2016/0124427 A1    May 5, 2016

Related U.S. Application Data

(63) Continuation of application No. PCT/JP2014/068081, filed on Jul. 7, 2014.

(30) Foreign Application Priority Data

Jul. 8, 2013  (JP) ............................. 2013-142780

(51) Int. Cl.
  *G06T 1/20*  (2006.01)
  *G05B 19/4093*  (2006.01)
  *G06F 17/50*  (2006.01)
  *G05B 15/02*  (2006.01)

(52) U.S. Cl.
  CPC ....... *G05B 19/40935* (2013.01); *G05B 15/02* (2013.01); *G06F 17/509* (2013.01); *G05B 2219/35061* (2013.01); *G06F 2217/36* (2013.01)

(58) Field of Classification Search
  None
  See application file for complete search history.

(56) References Cited

U.S. PATENT DOCUMENTS

| | | | |
|---|---|---|---|
| 6,477,437 B1 * | 11/2002 | Hirota | G06Q 10/10 700/108 |
| 6,898,473 B2 | 5/2005 | Kabasawa | |
| 7,403,876 B2 | 7/2008 | Tsuchiya et al. | |
| 9,158,968 B2 | 10/2015 | Okamoto | |
| 2004/0019399 A1 | 1/2004 | Kabasawa | |

(Continued)

FOREIGN PATENT DOCUMENTS

| | | |
|---|---|---|
| JP | 2000-003379 A | 1/2000 |
| JP | 2003-150647 A | 5/2003 |

(Continued)

OTHER PUBLICATIONS

May 9, 2017—(JP) Notification of Reasons for Refusal—App 2013-142780.

(Continued)

*Primary Examiner* — Michael Lebentritt
(74) *Attorney, Agent, or Firm* — Banner & Witcoff, Ltd.

(57) ABSTRACT

An analysis device refers to information included in a recorded product drawing, builds apart of or the entire wire harness by drawing corresponding graphic data of each member constituting the wire harness, adds non-corresponding graphic data to the built wire harness, and displays the product drawing.

9 Claims, 10 Drawing Sheets

(56) References Cited

U.S. PATENT DOCUMENTS

| | | | | |
|---|---|---|---|---|
| 2006/0141823 | A1* | 6/2006 | Yamane | B60R 16/0207 439/76.2 |
| 2008/0068389 | A1* | 3/2008 | Bakalash | G06F 9/5044 345/505 |
| 2008/0094403 | A1* | 4/2008 | Bakalash | G06F 9/5066 345/505 |
| 2012/0044257 | A1 | 2/2012 | Okamoto | |
| 2013/0083107 | A1* | 4/2013 | Nishikawa | B41J 2/0451 347/10 |
| 2014/0245604 | A1 | 9/2014 | Hashizawa et al. | |
| 2014/0316741 | A1* | 10/2014 | Iimori | G06F 17/50 702/158 |
| 2016/0179989 | A1* | 6/2016 | Nakamura | B60R 16/0215 703/1 |
| 2017/0015112 | A1* | 1/2017 | Yoshigai | B41J 11/008 |

FOREIGN PATENT DOCUMENTS

| | | |
|---|---|---|
| JP | 2004-046815 A | 2/2004 |
| JP | 2006-113800 A | 4/2006 |
| JP | 2008-123326 A | 5/2008 |
| JP | 2011-022954 A | 2/2011 |
| JP | 2012-064191 A | 3/2012 |
| JP | 2013109936 A | 6/2013 |

OTHER PUBLICATIONS

Aug. 26, 2014—International Search Report—Intl App PCT/JP2014/068081.

Aug. 26, 2014—(WO) Written Opinion of the ISA—Intl App PCT/JP2014/068081, Eng Tran.

Mar. 2, 2018—(CN) The First Office Action—App 201480038989.3.

Pei Tan, et al, "Research on the Automatic Comparison Algorithm for CAD Drawings", Electronic Technology, p. 16-18 (English Abstract).

Apr. 2, 2018—(US) Non-Final Office Action—U.S. Appl. No. 14/951,879.

May 9, 2017—(JP) Notification of Reasons for Refusal—App 2013-116044.

Aug. 26, 2014—(WO) Written Opinion—App PCT/JP2014/064140.

Aug. 26, 2014—(WO) International Search Report—App PCT/JP2014/064140.

\* cited by examiner

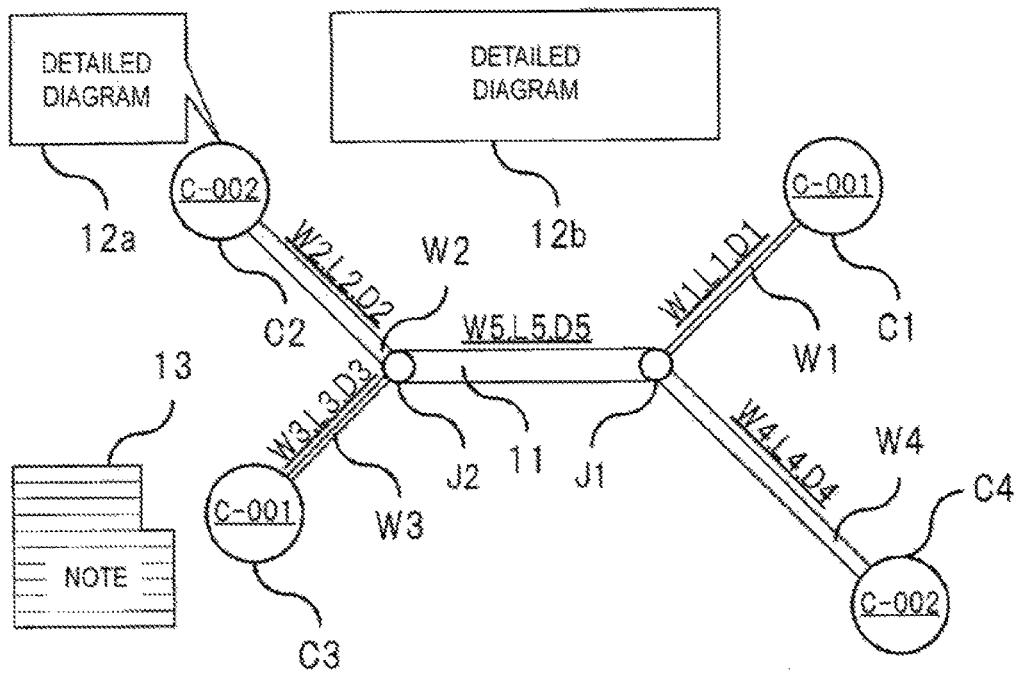

| REVISED EDITION NUMBER | 3.0.2 |
| LATEST UPDATE DATE | 00/01/01 |
| MOUNTING VEHICLE | AAA-BBB |
| TARGET PART NUMBER | CCC-DDD |
| USAGE LOCATION | RIGHT DOOR |

REMARKS
****************************************
****************************************
****************************************

ANALYSIS DEVICE, ANALYSIS METHOD, AND PROGRAM

CROSS REFERENCE TO RELATED APPLICATIONS

This application is a continuation of international patent application No. PCT/JP2014/068081 filed Jul. 7, 2014 based on Japanese Patent Application No. 2013-142780 filed Jul. 8, 2013; the contents of which are incorporated herein by reference in its entirety.

BACKGROUND OF THE INVENTION

1. Field of the Invention

The present invention relates to an analysis device, an analysis method, and a program, capable of displaying a part of or the entire wire harness by referring to information included in a product drawing.

2. Description of the Related Art

The design of a wire harness used in a vehicle or the like is prepared along with the progress of the design of a vehicle in which the wire harness is used. Typically, in a production preparation period in which a wire harness is designed, a request for a route layout of the wire harness is made by a manufacturer of a vehicle or the like (hereinafter, simply referred to as a car manufacturer), and a parts manufacturer receiving the request manufactures a wire harness satisfying the request.

In the production preparation period, model changes or specification changes of a vehicle are repeatedly examined on the car manufacturer side, and change information related to every change is provided to the parts manufacturer. In response thereto, the parts manufacturer side designs a jig plate layout for manufacturing the wire harness for which the request is made by the car manufacturer side in consideration of a current jig plate layout, jigs owned by the car manufacturer, manufacturing efficiency and the like, and then proposes a route layout draft of a wire harness which can be manufactured by using the jig plate layout to the car manufacturer side. The car manufacturer side examines whether or not the route layout draft is accepted, and delivers a result thereof to the parts manufacturer side. In the production preparation period, this interaction is repeatedly performed between the car manufacturer side and the parts manufacturer side.

In the production preparation period, the parts manufacturer side is required to frequently change design of a jig plate layout or a route layout draft according to change information from the car manufacturer side. In addition, an amount of documents or drawings related to the change is also enormous. Under such a situation, there are demands for efficient design of a jig plate layout or a route layout draft which is frequently changed on the parts manufacturer side (JP-A-2004-046815, JP-A-2008-123326 and JP-A-2011-022954 as Patent Literatures 1, 2 and 3).

Patent Literature 1: JP-A-2004-046815
Patent Literature 2: JP-A-2008-123326
Patent Literature 3: JP-A-2011-022954

SUMMARY OF THE INVENTION

The change information delivered from the car manufacturer side to the parts manufacturer side includes a product drawing in which attribute information (information such as a diameter and a length of an electric wire, and a part number of a connector attached to the electric wire) of each member constituting a wire harness is added to the wire harness developed on the plane. In addition, the product drawing is added with a detailed drawing in which, when the product drawing is output on paper or a monitor, a predetermined part of the wire harness which cannot be sufficiently recognized from the output wire harness is drawn in detail. Further, the product drawing is added with various notes (for example, a revised edition number and the revised date of the product drawing) regarding the product drawing, which cannot be recognized from the wire harness drawn on the product drawing. The detailed diagram and the notes are described in an empty region of the product drawing in which the developed wire harness is not drawn.

The parts manufacturer side receives a new product drawing from the car manufacturer side when the car manufacturer side changes a model or a specification of a vehicle. In this case, the received new product drawing often results from change of some description from a product drawing of a wire harness mounted in the vehicle before the model or the specification is changed. In the current procedure, on the parts manufacturer side, an analyst checks changes of the received product drawing by visual observation through comparison with the product drawing before the model or the specification is changed.

However, in the checking by visual observation, the number of steps required in the checking work increases. In addition, in the checking by visual observation, there is a concern that all changes may not be extracted by the analyst.

The present invention has been made in consideration of the above-described circumstances, and an object thereof is to provide an analysis device, an analysis method and a program, in which an analyst can extract changes of a product drawing in a short period of time and can be prevented from forgetting to extract the changes.

In order to achieve the above-described object, an analysis device according to the present invention may include one of the following configurations (1) to (6).

(1) An analysis device including:
an input unit that receives an input operation from an analyst;
a display unit that displays a product drawing;
a recording unit that records first attribute data correlated with each member constituting a first wire harness, first corresponding graphic data correlated with the first attribute data, and first non-corresponding graphic data which is not correlated with the first attribute data, wherein the first attribute data, the first corresponding graphic data and the first non-corresponding data are included in a first product drawing as information, and records second attribute data correlated with each member constituting a second wire harness, second corresponding graphic data correlated with the second attribute data, and second non-corresponding graphic data which is not correlated with the second attribute data, wherein the second attribute data, the second corresponding graphic data and the second non-corresponding data are included in a second product drawing as information; and
a control unit that performs control of referring to the information included in the product drawings recorded in the recording unit, of building a part of or an entire wire harness by drawing corresponding graphic data of each member constituting the wire harness, of adding non-corresponding graphic data to the built wire harness, and of displaying the product drawings on the display unit, wherein, when the control unit causes the second product drawing to be displayed on the display unit, the control unit compares the first non-corresponding graphic data with the second non-corresponding graphic data, and displays in a discriminable manner the second non-corresponding graphic data which completely matches the first non-corresponding graphic data and the second non-corresponding graphic data which does not completely match the first non-corresponding graphic data.

(2) The analysis device according to the above configuration (1), wherein, when the control unit causes the second product drawing to be displayed on the display unit, the control unit further displays the second corresponding graphic data and the second non-corresponding graphic data in a discriminable manner.

(3) The analysis device according to the above configuration (1) or (2), wherein the control unit compares the first non-corresponding graphic data and the second non-corresponding graphic data with each other of which a drawing position on the first product drawing and a drawing position on the second product drawing match each other.

(4) The analysis device according to the above configuration (1) or (2), wherein the control unit displays the first product drawing on the display unit, the input unit receives an input operation of designating the first non-corresponding graphic data from the first product drawing displayed on the display unit, and an input operation of designating the second non-corresponding graphic data from the second product drawing displayed on the display unit, and the control unit compares the first non-corresponding graphic data and the second non-corresponding graphic data with each other, designated based on the input operations received by the input unit.

(5) The analysis device according to any one of the above configurations (1) to (4), wherein, when the control unit causes the second product drawing to be displayed on the display unit, the control unit compares the first non-corresponding graphic data with the second non-corresponding graphic data, and displays, in a first display color, the second non-corresponding graphic data which completely matches the first non-corresponding graphic data, and displays, in a second display color, the second non-corresponding graphic data which does not completely match the first non-corresponding graphic data.

(6) The analysis device according to the above configuration (5), wherein the input unit receives an input operation of designating the second non-corresponding graphic data which is displayed in the second display color, and an input operation of changing a display color to a third display color or a fourth display color, and the control unit changes a display color of the second non-corresponding graphic data designated based on the input operation received by the input unit to the third display color or the fourth display color.

In order to achieve the above-described object, an analysis method according to the present invention may include one of the following configurations (7) and (8).

(7) An analysis method including:

referring to first attribute data correlated with each member constituting a first wire harness, first corresponding graphic data correlated with the first attribute data, and first non-corresponding graphic data which is not correlated with the first attribute data, wherein the first attribute data, the first corresponding graphic data and the first non-corresponding data are included in a first product drawing as information, and referring to second attribute data correlated with each member constituting a second wire harness, second corresponding graphic data correlated with the second attribute data, and second non-corresponding graphic data which is not correlated with the second attribute data, wherein the second attribute data, the second corresponding graphic data and the second non-corresponding data are included in a second product drawing as information;

building a part of or an entire wire harness by drawing corresponding graphic data of each member constituting the wire harness;

adding non-corresponding graphic data to the built wire harness; and displaying the product drawings, wherein the first non-corresponding graphic data is compared with the second non-corresponding graphic data, and the second non-corresponding graphic data which completely matches the first attribute data and the second non-corresponding graphic data which does not completely match the first non-corresponding graphic data are displayed in a discriminable manner.

(8) The analysis method according to the above configuration (7), wherein the second corresponding graphic data and the second non-corresponding graphic data are displayed in a discriminable manner.

In order to achieve the above-described object, a storage medium according to the present invention may include the following configuration (9).

(9) A program causing a computer to execute each procedure of the analysis method according to the above configuration (7) or (8).

According to the apparatus with the above configurations (1) to (6), the analysis method with the above configuration (7) or (8), and the program of the above configuration (9), an analyst can extract changes of the product drawings in a short period of time and can also be prevented from forgetting to extract the changes.

The above description relates to a brief description of the present invention. Details of the present invention will become more apparent by reading through modes of carrying out the present invention (hereinafter, referred to as an "embodiment") described below with reference to the drawings.

BRIEF DESCRIPTION OF THE DRAWINGS

FIGS. 1A to 1E illustrate an example of a product drawing of a wire harness, in which FIG. 1A is a diagram schematically illustrating the product drawing of the wire harness; FIGS. 1B and 1C are matrices illustrating attribute information regarding each electric wire constituting the wire harness illustrated in FIG. 1A; FIG. 1D is a matrix illustrating attribute information regarding connectors C1 to C4 constituting the wire harness illustrated in FIG. 1A; and FIG. 1E illustrates attribute information regarding joint connectors J1 and J2 constituting the wire harness illustrated in FIG. 1A.

DETAILED DESCRIPTION OF THE EXEMPLARY EMBODIMENTS

Figure 2A:
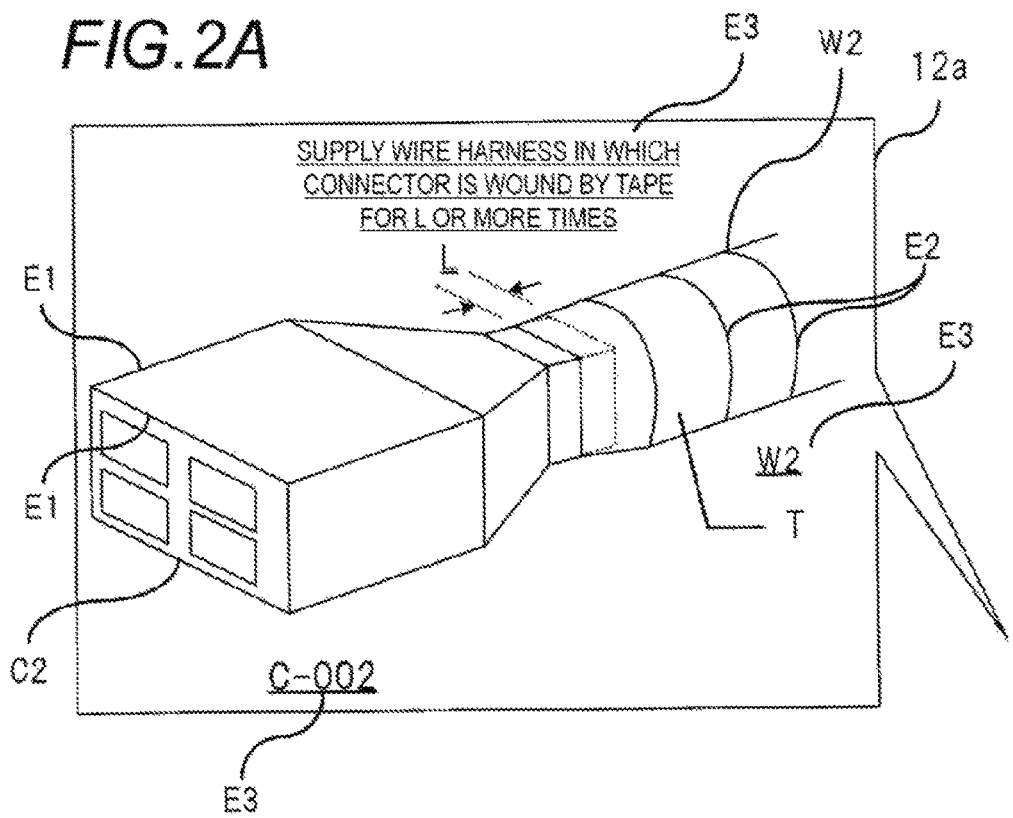
FIGS. 2A and 2B respectively illustrate examples of detailed diagrams in the product drawing.

Hereinafter, a description will be made of a specific embodiment of the present invention with reference to the respective drawings.

[Details of Product Drawing of Wire Harness]

First, with reference to FIGS. 1A to 3, a description will be made of an example of a product drawing of a wire harness which is received by a parts manufacturer from a car manufacturer.

The product drawing of the wire harness contains, as information, object information (hereinafter, referred to as object information X) for drawing the wire harness on the product drawing, object information (hereinafter, referred to as object information Y) for drawing a detailed diagram in which apart of the wire harness is described in detail on the product drawing, and object information (hereinafter, referred to as object information Z) for drawing various notes regarding the product drawing on the product drawing. Hereinafter, a description will be made of an example of each of data structures of the object information X, Y and Z.

[Object Information X for Drawing Wire Harness on Product Drawing]

The object information X is formed of a pair of attribute information in which attributes (for example, a length and a shape of an electric wire, an identifier of a terminal attached to the electric wire, a name and part number of a connector which accommodates the terminal, and an identifier C/N of a cavity of the connector which accommodates the terminal) of each member constituting the wire harness are described, and function information for defining procedures (a shape of a drawn target, a pattern of the target, a position at which the target is disposed, and the like) for drawing each member constituting the wire harness on the product drawing, for each member.

The attribute information and the function information of the object information X will be described in more detail. Herein, by using a wire harness 11 illustrated in FIG. 1A as an example, a description will be made of the object information X regarding each of electric wires W1 to W5, connectors C1 to C4, and joint connectors J1 and J2 constituting the wire harness 11. First, as illustrated in FIG. 1A, the wire harness 11 is configured to include the five electric wires W1 to W5, and each of the electric wires Wn (where n is 1 to 5) has a wire length Wn and a wire diameter Dn. In the respective electric wires Wn, one end of each of the electric wires W1 and W4 is connected to one end of the electric wire W5, and one end of each of the electric wires W2 and W3 is connected to the other end of the electric wire W5. In addition, one end of each of the electric wires W1 and W4 is connected to one end of the electric wire via the joint connector J1, and one end of each of the electric wires W2 and W3 is connected to the other end of the electric wire via the joint connector J2. Further, the other end of the electric wire W1 is connected to the connector C1; the other end of the electric wire W2 is connected to the connector C2; the other end of the electric wire W3 is connected to the connector C3; and the other end of the electric wire W4 is connected to the connector C4. As a result, the electric wires W1 to W5 are all in a conduction state.

In addition, the attribute information of the object information X will be described. The attribute information regarding each electric wire Wn constituting the wire harness illustrated in FIG. 1A is stored in a matrix form as illustrated in FIGS. 1B and 1C. The matrix illustrated in FIG. 1B describes attribute information regarding the wire length Ln and the line shape Dn of each electric wire Wn. In addition, the matrix illustrated in FIG. 1C describes information regarding connection destinations to which one end (start point) and the other end (end point) of each electric wire Wn are connected. Specifically the matrix illustrated in FIG. 1C describes, for example, the electric wire W1 so that a terminal Tf1 provided at one end (start point) is accommodated in a cavity of the joint connector J1, designated by cavity number (C/N) No. 1, and a terminal Tt1 provided at the other end (end point) is accommodated in a cavity of the connector C1, designated by cavity number (C/N) No. 4.

The attribute information regarding the connectors C1 to C4 constituting the wire harness illustrated in FIG. 1A is stored in a matrix form as illustrated in FIG. 1D. The matrix illustrated in FIG. 1D describes information regarding a connector name and a connector part number for each connector Cn.

In addition, attribute information regarding the joint connectors J1 and J2 constituting the wire harness illustrated in FIG. 1A is stored in a matrix form as illustrated in FIGS. 1D and 1E. The matrix illustrated in FIG. 1D describes a connector name and a connector part number for each joint connector Jn. Further, the matrix illustrated in FIG. 1E describes terminals which are brought into a conduction state via each joint connector Jn. Specifically, it is described with the notation of "&" that the terminal Tf1 (a terminal connected to one end of the electric wire W1), the terminal Tf4 (a terminal connected to one end of the electric wire W4), and the terminal Tf5 (a terminal connected to one end of the electric wire W5) are electrically connected to each other via the joint connector J1, for example.

As described with reference to FIGS. 1A to 1E, the attribute information of the object information X is described with regard to the respective members such as the electric wires W1 to W5, the connectors C1 to C4, and the joint connectors J1 and J2 constituting the wire harness 11 on the product drawing of the wire harness. In addition, the electric wires, the joint connectors, and the connectors have been exemplified as members constituting the wire harness, but other members constituting the wire harness are also described on the product drawing of the wire harness in the same manner.

Next, the function information of the object information X will be described. The function information defines procedures (a shape of a drawn target, a pattern of the target, a position where the target is disposed, and the like) for drawing each member constituting the wire harness. When function information regarding the electric wire Wn, the connector Cn, and the joint connector Jn is described by referring to the wire harness illustrated in FIG. 1A, the following procedures are defined in relation to the function information regarding the exhaust connector Cn and the joint connector Jn.

Each of the connector and the joint connector is described in a circular shape with a predetermined radius.

A connector part number of the connector obtained by referring to the attribute information is described inside the circular shape drawing each of the connector and the joint connector.

The circular shape drawing each of the connector and the joint connector is disposed so that a central point of the circular shape matches a predetermined position.

In addition, the following procedures are defined in relation to the function information regarding the electric wire Wn.

The electric wire is described as a line segment which connects a member accommodating a terminal connected to one end of the electric wire to a member accommodating a terminal connected to the other end of the electric wire.

A thickness of the line segment drawing the electric wire is described so as to correspond to a wire diameter of the electric wire obtained by referring to the attribute information.

A wire length and a wire diameter of the electric wire obtained by referring to the attribute information are described over the line segment drawing the electric wire so that character strings thereof are arranged in a direction of the line segment.

The attribute information and the function information of the object information X described above are prepared for each member of the wire harness in a state of being correlated with each other. In the present specification, the attribute information of the object information X is referred to as "attribute data" in some cases. A graphic and a character string drawn on the product drawing based on the attribute information and the function information of the object information X are referred to as "corresponding graphic data" in some cases. An analysis device which acquires the object information X including the attribute information and the function information performs a process of drawing corresponding graphic data for each member constituting the wire harness and building a part of or the entire wire harness. As a result, an image of the wire harness 11 illustrated in FIG. 1A is built, and attribute information corresponding to each member is added in the vicinity of the member of the built wire harness. In addition, in FIG. 1A, in order to discriminate the attribute information added in the vicinity of each member of the wire harness from the reference sign, the added attribute formation is underlined.

[Object Information Y for Drawing Detailed Diagram on Product Drawing]

The object information Y is information for drawing a detailed diagram in which a part of the wire harness is described in detail on the product drawing. The object information Y is formed of a pair of attribute information in which information regarding elements (a point, a shape of a line segment, a shape of a curve, a shape of any contour made by a line segment or a curve, a character string, and the like) shaping a graphic is described, and function information for defining procedures (a line type of element, a position where the element is disposed, a pattern of the element, and the like) for drawing elements shaping a graphic.

Figure 2B:
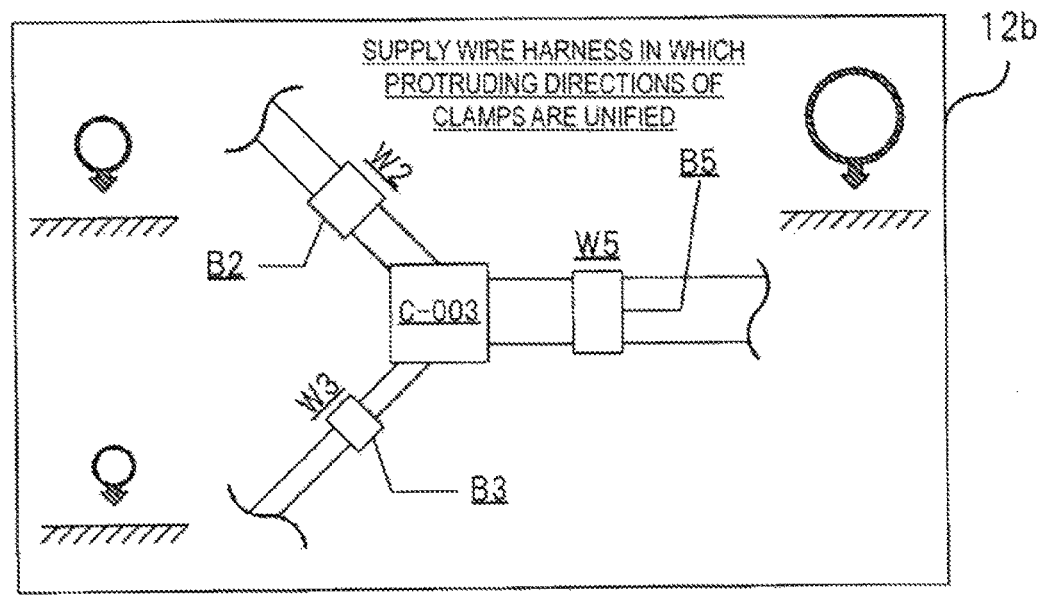

The attribute information and the function information of the object information Y will be described more in detail. Herein, as illustrated in FIG. 1A, as an example, a description will be made of a form in which a detailed diagram 12a which describes the connector C2 in detail and a detailed diagram 12b which describes the electric wires W2, W3 and W5 in detail are drawn on the product drawing. FIGS. 2A and 2B respectively illustrate examples of the detailed diagrams. The detailed diagram 12a illustrated in FIG. 2A shows a perspective view of the connector C2. In addition, the detailed diagram 12b illustrated in FIG. 2B shows a diagram for explaining an attachment structure when the electric wires W2, W3 and W5 are used in a vehicle.

Graphics drawn as the detailed diagram 12a illustrated in FIG. 2A are built when respective elements such as line segments E1, curves E2, and a character string E3 described in the attribute information of the object information Y are drawn according to conditions (a line type, a position, a pattern, and the like) defined by the function information of the object information Y. For example, a plurality of line segments E1 are disposed according to the defined condition so that the connector C2 is shaped; a plurality of line segments E1 and curves E2 are disposed according to the defined condition so that the electric wire W2 whose outer circumference is wound by a tape T is shaped; and disclosures for specifying the connector C2 and the electric wire W2 are exhibited by disposing character strings according to the defined condition. In addition, an intention to draw the detailed diagram 12a, that is, the content of which the car manufacturer side notifies the parts manufacturer side is represented by a character string E3, that is, "supply the wire harness in which the connector is wound by the tape for L or more times". In addition, in FIG. 2A, in order to discriminate the character string element E3 from the reference sign, the element E3 is underlined.

Graphics drawn as the detailed diagram 12b illustrated in FIG. 2B are built in the same manner as in FIG. 2A when respective elements such as line segments, curves, and a character string described in the attribute information of the object information Y are drawn according to conditions (a line type, a position, a pattern, and the like) defined by the function information of the object information Y. For example, a plurality of line segments, curves, rectangular frames, and character strings, and the like are disposed according to the defined condition so that graphics indicating positional relationships between the electric wires W2, W3 and W5 at the center of the drawing and bands B2, B3 and B5 are shaped; and a plurality of line segments and circular frames, and the like are disposed according to the defined condition so that graphics indicating directions of clamps provided at the bands B2, B3 and B5 are shaped. In addition, an intention to draw the detailed diagram 12b, that is, the content of which the car manufacturer side notifies the parts manufacturer side is represented by "supply the wire harness in which protruding directions of the clamps are unified".

As illustrated in FIGS. 2A and 2B, the graphics for explaining the content which is hard to deliver in the graphics of the wire harness which is built in the product drawing according to the description of the object information X, that is, the content which is not defined as the attribute information of the object information X are drawn on the detailed diagrams 12a and 12b. For this reason, in the detailed diagram built according to the description of the object information Y, an analyst who observes the product drawing recognizes the relationship of the wire harness in the product drawing, but the attribute information of the object information X and the object information Y are not correlated with each other in terms of a data structure. As mentioned above, the graphics and character strings drawn on the product drawing based on the attribute information and the function information of the object information Y without being correlated with the attribute information of the object information X are referred to as "non-corresponding graphic data" in some cases. The analysis device which acquires the object information Y performs a process of drawing the non-corresponding graphic data so as to build the detailed diagrams. As a result, the detailed diagrams 12a and 12b illustrated in FIG. 1A are added to the product drawing.

In addition, the form has been described hitherto in which the elements described by the attribute information of the object information Y are disposed according to the conditions defined in the function information of the object information Y, and thus the detailed diagrams are built. Regarding another form of the data structure of the object information Y, information indicating image data or a preservation destination in which the image data is stored may be prepared as the attribute information, and the function information may describe a position at which image data is disposed, a magnification ratio and a reduction ratio of the image data, an aspect ratio of the image data, and the like.

[Object Information Z for Drawing Notes on Product Drawing]

The object information Z is object information for drawing various notes regarding the product drawing on the product drawing. The object information Z is formed of a pair of attribute information in which information regarding character strings, surrounding frames, and ruled lines, and function information defining procedures (a line type of surrounding frame or ruled line, a position where a character string is disposed, and the like) for drawing a character string within a surrounding frame.

Figures 3, 4:
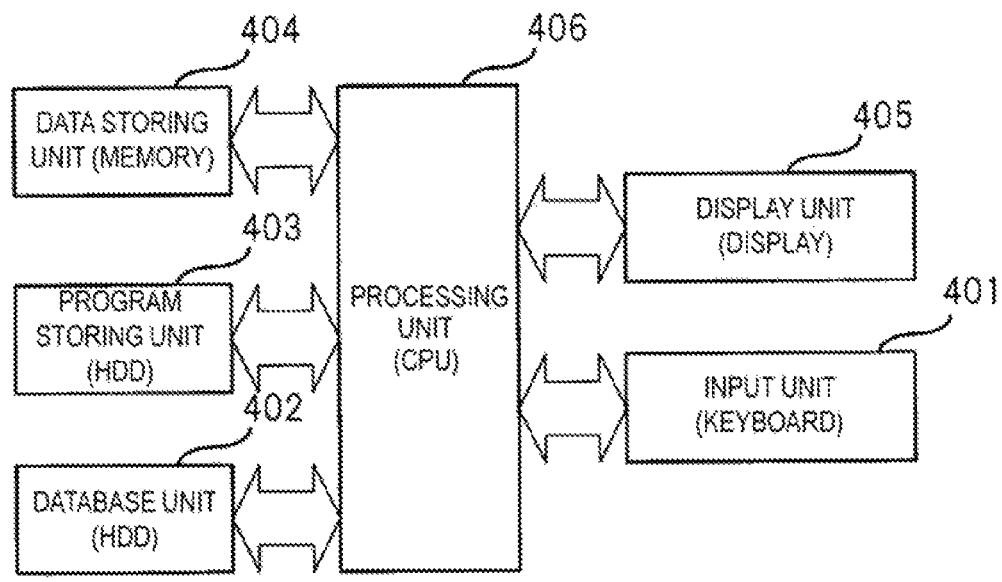
FIG. 3 illustrates examples of notes in the product drawing.
FIG. 4 is a functional block diagram of an analysis device according to an embodiment of the present invention.

The attribute information and the function information of the object information Z will be described more in detail. Herein, a description will be made of a form in which a note 13 is drawn on the product drawing illustrated in FIG. 1A. FIG. 3 illustrates an example of the note. The note 13 describes various notes (for example, a revised edition number and the revised date of the product drawing) regarding the product drawing, which cannot be recognized from the wire harness drawn on the product drawing.

A graphic drawn as the note 13 illustrated in FIG. 3 is built when character strings E4, surrounding frames E5, and a ruled line E6 described in the attribute information of the object information Z are drawn according to conditions (a line type, a position, a pattern, and the like) defined by the function information of the object information Y. In FIG. 3, the various character strings E4 are disposed in cells formed by the surrounding frames E5 and the ruled line E6 so that the note 13 is shaped.

As illustrated in FIG. 3, the note 13 draws the graphic for explaining the content which is hard to deliver in the graphics of the wire harness which is built on the product drawing according to the description of the object information X, that is, the content which is not defined by the attribute information of the object information X. For this reason, in the note built according to the description of the object information Z, the analyst who observes the product drawing recognizes the relationship of the wire harness in the product drawing, but the attribute information of the object information X and the object information Z are not correlated with each other in terms of a data structure. As mentioned above, the graphics and character strings drawn on the product drawing based on the attribute information and the function information of the object information Z without being correlated with the attribute information of the object information X are referred to as "non-corresponding graphic data" in some cases. The analysis device which acquires the object information Z performs a process of drawing the non-corresponding graphic data so as to build the note. As a result, the note 13 illustrated in FIG. 1A is added to the product drawing.

As mentioned above, a detailed description has been made of the data structure of the product drawing containing the object information X, Y and Z, and a display example of the product drawing built according to the description of the object information X, Y and Z.

Hereinafter, a description will be made of a method of capable of efficiently extracting changes which are generated in a changed product drawing by using the analysis device.

[Details of Analysis Device of the Present Embodiment]

A detailed description will be made of a configuration of the analysis device of the present embodiment. FIG. 4 is a functional block of the analysis device according to the embodiment of the present invention.

[Functional Configuration of Analysis Device of the Present Invention]

The analysis device according to the embodiment of the present invention is configured to include an input unit 401, a database unit 402, a program storing unit 403, a data storing unit 404, a display unit 405, and a processing unit 406. For example, in a case where the analysis device of the present invention is configured by using a general purpose PC, the input unit 401 is realized by various input interfaces such as a keyboard, a mouse, and ten keys. The database unit 402 and the program storing unit 403 are realized by a hard disk drive (HDD). The data storing unit 404 is realized by a random access memory (RAM). The display unit 405 is realized by various output devices such as a CRT display and a liquid crystal display. The processing unit 406 is realized by a central processing unit (CPU). The database unit 402 stores data for describing the product drawing of the wire harness. In addition, the program storing unit 403 records a program which causes the processing unit 406 to execute [Details of changes extraction algorithm] which will be described later. Further, the data storing unit 404 stores data which is input to and output from the processing unit 406 which is executing [Details of changes extraction algorithm] which will be described later.

[Details of Changes Extraction Algorithm]

A changes extraction algorithm executed by the analysis device according to the embodiment of the present invention is divided into the following three phases. In other words, the three phases include an attribute data comparison phase, a non-corresponding graphic data comparison phase, and a comparison phase by visual observation. Hereinafter, a description will be made in an order of the attribute data comparison phase, the non-corresponding graphic data comparison phase, and the comparison phase by visual observation.

[Details of Attribute Data Comparison Phase]

In the attribute data comparison phase, a wire harness in each of a product drawing before being changed and a product drawing after being changed is built by performing the following processes.

(A1) By referring to attribute information (hereinafter, referred to as first attribute data) of the object information X regarding any member constituting a wire harness, described on a product drawing (hereinafter, referred to as a first product drawing) before being changed, matching or mismatching with attribute information (hereinafter, referred to as second attribute data) of the object information X described on a product drawing (hereinafter, referred to as a second product drawing) after being changed, and the extent of matching if the matching occurs are determined.

(A2-1) In a case where there is the second attribute data which completely matches the first attribute data, corresponding graphic data (hereinafter, referred to as first corresponding graphic data) correlated with the first attribute data is displayed in a first display color on the first product drawing.

(A2-2) In a case where there is the second attribute data which completely matches the first attribute data, corresponding graphic data (hereinafter, referred to as second corresponding graphic data) correlated with the second attribute data is displayed in the first display color on the second product drawing.

(A2-3) In a case where there is the second attribute data which partially matches the first attribute data, the first corresponding graphic data correlated with the first attribute data is displayed in a third display color which is different from the first display color on the first product drawing.

(A2-4) In a case where there is the second attribute data which partially matches the first attribute data, the second corresponding graphic data correlated with the second attribute data is displayed in the third display color which is different from the first display color on the second product drawing.

(A2-5) In a case where it is determined that the second attribute data has no data matching the first attribute data, the first corresponding graphic data correlated with the first attribute data is displayed in a fourth display color which is different from the first display color and the third display color on the first product drawing.

(A3) The processes in the above (A1) to (A2-5) are performed on each item of the first attribute data described on the first product drawing, and, after the execution of the processes in the above (A1) to (A2-5) on all items of the first attribute data is completed, the second corresponding graphic data correlated with the second attribute data excluding the second corresponding graphic data which completely matches the first attribute data and partially matches the first attribute data is displayed in a fourth display color which is different from the first display color and the third display color.

First, in the process in the above (A1), matching or mismatching between the first attribute data and the second attribute data, and the extent of matching if the matching occurs are determined as follows. In other words, the first attribute data of any member constituting the wire harness on the first product drawing is referred to and is collated with the second attribute data of all members constituting the wire harness on the second product drawing. For example, as illustrated in FIGS. 1B and 1C, in a case where attribute data of the electric wire is described, among the first attribute data items (the wire identifier W1, the wire length L1, the wire diameter D1, the start point information J1, Tf1, and No. 1 and the end point information C1, Tt1, and No. 4) of the electric wire W1, the wire identifier W1 is referred to from the first product drawing, and the second attribute data specified by the wire identifier W1 is searched for in the second product drawing. If the second attribute data specified by the wire identifier W1 is present, the wire length L1 is subsequently referred to among the remaining information (the wire length L1, the wire diameter D1, the start point information J1, Tf1, and No. 1, and the end point information C1, Tt1, and No. 4) included in the first attribute data, and the second attribute data specified by the wire length L1 is searched for in the second product drawing. If the second attribute data specified by the wire length L1 is present, the wire diameter D1 is subsequently referred to among the remaining information (the wire diameter D1, the start point information J1, Tf1, and No. 1, and the end point information C1, Tt1, and No. 4) included in the first attribute data. Thereafter, this process is repeatedly performed as long as information which constitutes the second attribute data and matches information which is referred to is present in relation to the second attribute data specified by the wire identifier W1 in the second product drawing. As a result of the process, if the second attribute data which matches all pieces of information constituting the first attribute data is present, the above (A2-1) and (A2-2) are executed. For example, in a case where the attribute data of the electric wire is described as illustrated in FIGS. 1B and 1C, if the second attribute data which completely matches each piece of information of the first attribute data (the wire identifier W1, the wire length L1, the wire diameter D1, the start point information J1, Tf1, and No. 1, and the end point information C1, Tt1, and No. 4), referred to from the first product drawing, is present in the electric wire of the second product drawing, the above (A2-1) and (A2-2) are executed. Hereinafter, all pieces of information constituting the first attribute data of a certain member in the first product drawing matching all pieces of information constituting the second attribute data of a certain member in the second product drawing is referred to as complete matching.

In addition, as a result of the process in the above (A1), in a case where matching with some information constituting the first attribute data occurs but matching with all pieces of information constituting the first attribute data does not occur, the above (A2-3) and (A2-4) are executed. For example, in a case where the attribute data of the electric wire is described as illustrated in FIGS. 1B and 1C, if among the respective pieces of information of the first attribute data (the wire identifier W1, the wire length L1, the wire diameter D1, the start point information J1, Tf1, and No. 1, and the end point information C1, Tt1, and No. 4), referred to from the first product drawing, the second attribute data which matches the wire identifier W1 and the wire length L1 as some of the information pieces but does not match the wire diameter D1 as other partial information pieces is present in the electric wire of the second product drawing, the above (A2-3) and (A2-4) are executed. Hereinafter, some information constituting the first attribute data of a certain member in the first product drawing matching some information constituting the second attribute data of a certain member in the second product drawing is referred to as partial matching.

In addition, as a result of the process in the above (A1), in a case where information which matches information constituting the first attribute data is not present, the above (A2-5) is executed. For example, in a case where the attribute data of the electric wire is described as illustrated in FIGS. 1B and 1C, if among the respective pieces of information of the first attribute data (the wire identifier W1, the wire length L1, the wire diameter D1, the start point information J1, Tf1, and No. 1, and the end point information C1, Tt1, and No. 4), referred to from the first product drawing, information which matches the wire identifier W1 is not present in the second attribute data of the second product drawing, the above (A2-5) is executed.

In the processes in the above (A2-1) and (A2-2), the first corresponding graphic data is drawn on the first product drawing by referring to the function information correlated with the first attribute data which completely matches the second attribute data. At this time, the first corresponding graphic data is drawn gray as a display color. In addition, the second corresponding graphic data is drawn on the second product drawing by referring to the function information correlated with the second attribute data which completely matches the first attribute data. At this time, the second corresponding graphic data is drawn gray as a display color. As a result, when the first product drawing and the second product drawing are output, the second corresponding graphic data is displayed gray, which indicates the same member without any change between the first product drawing and the second product drawing.

In the processes in the above (A2-3) and (A2-4), the first corresponding graphic data is drawn on the first product drawing by referring to the function information correlated with the first attribute data which partially matches the second attribute data. At this time, the first corresponding graphic data is drawn pink as a display color. In addition, the second corresponding graphic data is drawn on the second product drawing by referring to the function information correlated with the second attribute data which partially matches the first attribute data. At this time, the second corresponding graphic data is drawn pink as a display color. As a result, when the first product drawing and the second product drawing are output, the second corresponding graphic data is displayed pink, which indicates a member in which a partial change occurs between the first product drawing and the second product drawing.

In the process in the above (A2-5), the first corresponding graphic data is drawn on the first product drawing by referring to the function information correlated with the first attribute data. At this time, the first corresponding graphic data is drawn blue as a display color. As a result, when the first product drawing is output, the first corresponding graphic data is displayed blue, which indicates a member which is canceled in the second product drawing.

When the processes in the above (A1) to (A2-5) are performed on each item of the first attribute data described on the first product drawing, and the execution of the processes in the above (A1) to (A2-5) on all the items of the first attribute data is completed, the same member without any change compared with the first product drawing is displayed gray a member in which a partial change occurs compared with the first product drawing is displayed pink, and a member which is canceled in the second product drawing is displayed blue, on the first product drawing. On the other hand, on the second product drawing, the same member without any change compared with the first product drawing is displayed gray a member in which a partial change occurs compared with the first product drawing is displayed pink, and a member which is not present in the first product drawing and is added to the second product drawing is not displayed. In the process in the above (A3), the second attribute data which is not displayed and remains is extracted when the execution of the processes in the above (A1) to (A2-5) on all the items of the first attribute data is completed, and the second corresponding graphic data is drawn on the second product drawing by referring to the function information correlated with the second attribute data. At this time, the second corresponding graphic data is displayed green as a display color. As a result, when the second product drawing is output, the second corresponding graphic data is displayed green, which indicates a member which is added to the second product drawing.

An identifier (flag) indicating that the process has been performed is added to each item of the second attribute data on which the processes in the above (A2-1) to (A2-4) have been performed, and, in the process in the above (A3), the second attribute data to which the identifier is not added is extracted.

In addition, in the process in the above (A3), a display color in which the second corresponding graphic data is displayed is green. This is because the first corresponding graphic data which is displayed on the first product drawing and is canceled in the second product drawing can be displayed so as to be discriminated from the first corresponding graphic data which is displayed on the second product drawing and is added to the second product drawing. A display color in which the second corresponding graphic data is displayed in the process in the above (A3) may be colors other than gray and pink, and may be blue which the second corresponding graphic data is displayed in the process in the above (A2-5).

Figure 5A:
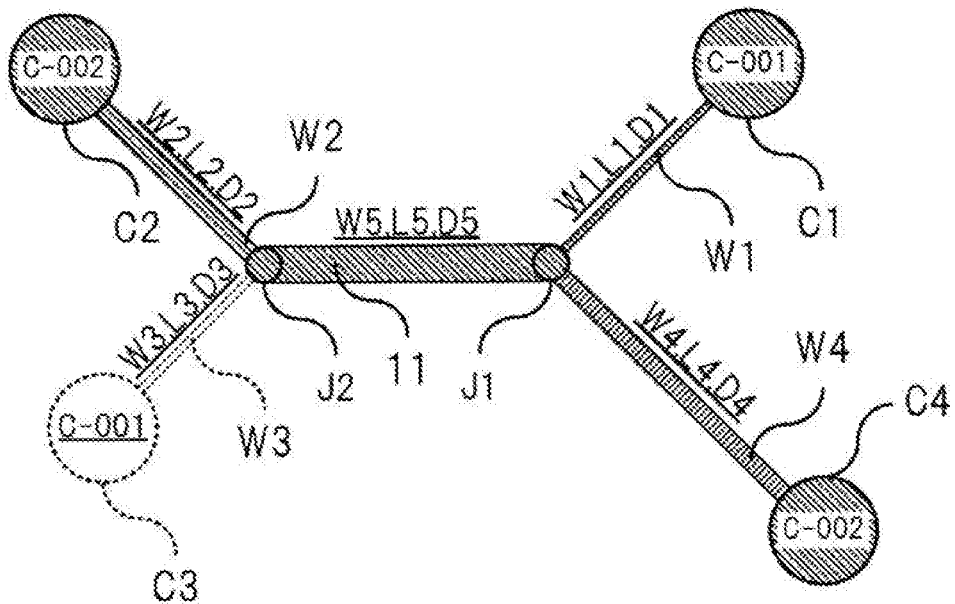
FIG. 5A illustrates a display example of a first product drawing in which a status of a wire harness is shown clearly.
Figure 5B:
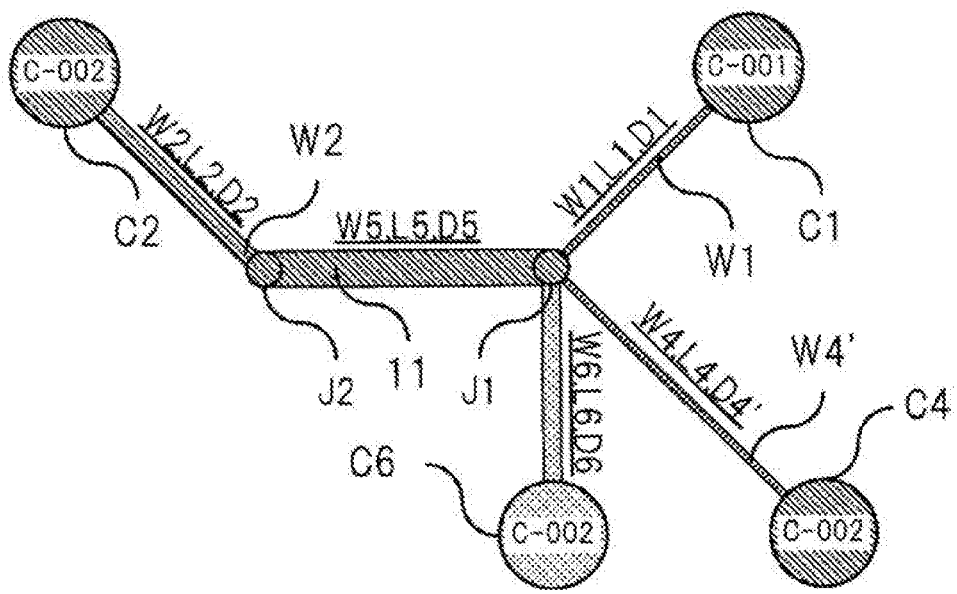
FIG. 5B illustrates a display example of a second product drawing in which a status of a wire harness is shown clearly.

The processes in the above (A1) to (A2-5) are performed on the first attribute data described on the first product drawing and regarding each of all members constituting the wire harness, and, then, the process in the above (A3) is performed on the second product drawing. On the first product drawing which is built in the above-described way a member which is common to the second product drawing is displayed gray a member in which a partial change occurs in the second product drawing is displayed pink, and a member which is canceled in the second product drawing is blue. Therefore, each status is explicitly displayed. On the other hand, on the second product drawing, a member which is common to the first product drawing is displayed gray, a member in which a partial change occurs compared with the first product drawing is displayed pink, and a member which is added to the second product drawing is green. Therefore, each status is explicitly displayed. FIG. 5A illustrates a display example of the first product drawing in which the statuses of the wire harness are explicitly shown, and FIG. 5B illustrates a display example of the second product drawing in which the statuses of the wire harness are explicitly shown. FIGS. 5A and 5B represent differences between the display colors by using the presence or absence of hatching and differences between patterns.

In FIGS. 5A and 5B, it is assumed that the diameter of the electric wire W4 is changed from D4 to D4' between the first product drawing and the second product drawing; the electric wire W3 and the connector C3 which are present in the first product drawing are canceled in the second product drawing; and a electric wire W6 and a connector C6 connected to the electric wire W6, which are not present in the first product drawing are added to the second product drawing. In the display example illustrated in FIG. 5A, the electric wire W4 in which a partial change occurs in the second product drawing is displayed pink (hatching from the upper right toward the lower left); the electric wire W3 and the connector C3 which are canceled in the second product drawing are displayed blue (white and a dotted frame); and other members common to the first product drawing and the second product drawing are displayed gray (hatching from the upper left toward the lower right). On the other hand, in the display example illustrated in FIG. 5B, the electric wire W4 in which a partial change occurs in the second product drawing is displayed pink (hatching from the upper right toward the lower left); the electric wire W6 and the connector C6 which are added to the second product drawing are displayed green (dotted hatching); and other members common to the first product drawing and the second product drawing are displayed gray (hatching from the upper left toward the lower right).

In the above-described manner, the analyst who visually recognizes the first product drawing or the second product drawing in which the statuses are explicitly displayed can specify the difference between the wire harness described on the first product drawing and the wire harness described on the second product drawing at a glance, that is, can recognize the partially changed member, the added member, or the canceled member. In addition, corresponding graphic data whose attribute data items match each other in the first product drawing and the second product drawing but which is drawn in different shapes can be drawn so that there is no change (that is, gray). As a result, it is possible to reliably extract the presence or absence of changes of the corresponding graphic data.

In [Details of attribute data comparison phase], the member which is canceled in the second product drawing is displayed blue on the first product drawing through the process in the above (A2-5), and the member which is added to the second product drawing is drawn green on the second product drawing through the process in the above (A3). In addition to the above drawing, the member which is canceled in the second product drawing is displayed orange on the first product drawing, and the member which is added to the second product drawing is drawn orange on the second product drawing through the process in the above (A3). As a result of such display, the analyst can visually recognize the member added to the second product drawing, and may be caused to prompt an input operation on the corresponding graphic data which is displayed orange in "Comparison phase by visual observation" which will be described later.

[Details of Non-Corresponding Graphic Data Comparison Phase]

In the non-corresponding graphic data comparison phase subsequent to the attribute data comparison phase, detailed diagrams and notes in a product drawing before being changed and a product drawing after being changed are built by performing the following processes.

(B1) The object information Y regarding a detailed diagram and the object information Z regarding a note, described on the first product drawing, and the object information Y regarding a detailed diagram and the object information Z regarding a note, described on the second product drawing are extracted.

(B2) Non-corresponding graphic data based on the object information Y and non-corresponding graphic data (hereinafter, referred to as first non-corresponding graphic data) based on the object information Z, described on the first product drawing, are displayed in a second display color which is different from the first display color, the third display color, and the fourth display color, on the first product drawing.

(B3) Non-corresponding graphic data based on the object information Y and non-corresponding graphic data (hereinafter, referred to as second non-corresponding graphic data) based on the object information Z, described on the second product drawing, are displayed in a second display color which is different from the first display color, the third display color, and the fourth display color, on the second product drawing.

First, in the process in the above (B1), the object information Y and the object information Z are extracted from each of the first product drawing and the second product drawing as follows. As described in [Object information Y for drawing detailed diagram on product drawing] and [Object information Z for drawing note on product drawing], the attribute information and the function information of the object information Y and the attribute information and the function information of the object information Z are not correlated with the attribute information of the object information X. A data structure of the attribute information of the object information X is different from data structures of the attribute information of the object information Y and Z. A difference between the data structures is determined, and thus the object information Y and the object information Z can be extracted. The object information Y and the object information Z extracted in the process in the above (B1) correspond to data which is not a target of the process in the above (A1) of [Details of attribute data comparison phase]. For this reason, an identifier (flag) indicating that the process has been performed may be added to data on which the process in the above (A1) has been performed, and, in the process in the above (B1), data to which the identifier is not added may be extracted as the object information Y and the object information Z.

In the process in the above (B2), the first non-corresponding graphic data is drawn on the first product drawing by referring to the function information of the extracted object information Y and object information Z. At this time, the first non-corresponding graphic data is displayed orange as a display color.

In the process in the above (B3), the second non-corresponding graphic data is drawn on the second product drawing by referring to the function information of the extracted object information Y and object information Z. At this time, the second non-corresponding graphic data is displayed orange as a display color.

On the first product drawing which is built in the above-described way, the first corresponding graphic data is explicitly displayed gray, pink, or blue, and, on the other hand, the first non-corresponding graphic data is explicitly displayed orange which is different from such a display color. In addition, on the second product drawing, the second corresponding graphic data is explicitly displayed gray pink, or blue, and, on the other hand, the second non-corresponding graphic data is explicitly displayed orange which is different from such a display color.

In the above-described manner, the analyst who visually recognizes the first product drawing or the second product drawing in which the statuses are explicitly displayed can specify the detailed diagrams and the notes described on the first product drawing and the detailed diagrams and the notes described on the second product drawing at a glance. As a result, it is possible to easily discriminate the wire harness described on the product drawing from the detailed diagrams and the notes described on the product drawing.

Next, in the non-corresponding graphic data comparison phase, the subsequent process is performed, and thus display colors of the detailed diagrams and the notes in the product drawing before being changed and the product drawing after being changed are changed.

(B4) Matching or mismatching with the object information Y constituting the detailed diagrams described on the second product drawing is determined by referring to the object information Y constituting the detailed diagrams described on the first product drawing. Similarly matching or mismatching with the object information Z constituting the notes described on the second product drawing is determined by referring to the object information Z constituting the notes described on the first product drawing.

(B5) In a case where the object information Y which completely matches the object information Y described on the first product drawing is present in the second product drawing, the first non-corresponding graphic data based on the object information Y described on the first product drawing is displayed in a first display color on the first product drawing. Similarly, in a case where the object information Z which completely matches the object information Z described on the first product drawing is present in the second product drawing, the first non-corresponding graphic data based on the object information Z described on the first product drawing is displayed in the first display color on the first product drawing.

(B6) In a case where the object information Y which completely matches the object information Y described on the first product drawing is present in the second product drawing, the second non-corresponding graphic data based on the object information Y described on the second product drawing is displayed in the first display color on the second product drawing. Similarly, in a case where the object information Z which completely matches the object information Z described on the first product drawing is present in the second product drawing, the second non-corresponding graphic data based on the object information Z described on the second product drawing is displayed in the first display color on the second product drawing.

In the process in the above (B4), matching or mismatching with the object information Y described on the second product drawing is determined by referring to the object information Y described on the first product drawing. At this time, conceptually, respective elements shaping the detailed diagrams and the notes described on the first product drawing are referred to, and thus matching or mismatching with respective elements shaping the detailed diagrams and the notes described on the second product drawing, and matching or mismatching of the function information are determined. In other words, if the object information Y of which the attribute information and the function information match those of the object information Y described on the first product drawing in all the elements is present in the second product drawing, it is determined that the object information Y described on the second product drawing is also described on the first product drawing. On the other hand, if the object information Y of which the attribute information and the function information match those of the object information Y described on the first product drawing in some of the elements is present in the second product drawing, or no object information Y which matches any element of the object information Y described on the first product drawing is present in the second product drawing, it is determined that the object information Y corresponding to the object information Y described on the first product drawing is not present in the second product drawing. In addition, when matching or mismatching of the attribute information of each element, and matching or mismatching of the function information thereof are determined, if matching or mismatching of a procedure for defining a drawing position of the element is first determined, it is possible to efficiently determine matching or mismatching of an element (this is because, if drawing positions are different from each other, there is a high probability that such elements are different from each other). The same process is performed on the object information Z described on the first product drawing and the object information Z described on the second product drawing.

In the process in the above (B5), if the object information Y which completely matches the object information Y described on the first product drawing is present in the second product drawing, the first non-corresponding graphic data is drawn on the first product drawing based on the object information Y described on the first product drawing. At this time, the first non-corresponding graphic data is drawn gray as a display color. As a result, when the first product drawing is output, the first non-corresponding graphic data is displayed gray, which indicates the detailed diagram without any change compared with the first product drawing. The same process is performed on the object information Z described on the first product drawing and the second product drawing.

In the process in the above (B6), if the object information Y which completely matches the object information Y described on the first product drawing is present in the second product drawing, the second non-corresponding graphic data is drawn on the second product drawing based on the object information Y described on the second product drawing. At this time, the second non-corresponding graphic data is drawn gray as a display color. As a result, when the second product drawing is output, the second non-corresponding graphic data is displayed gray, which indicates the detailed diagram without any change compared with the first product drawing. The same process is performed on the object information Z described on the first product drawing and the second product drawing.

Figure 6A:
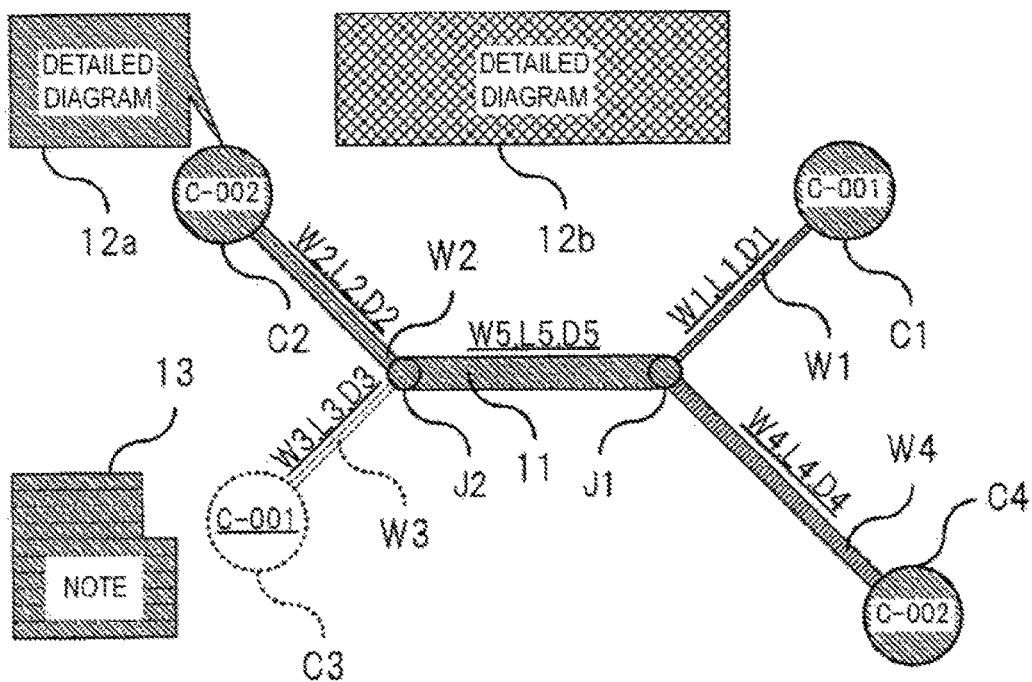
FIG. 6A illustrates a display example of a first product drawing in which statuses of a wire harness, a detailed diagram, and notes are shown clearly
Figure 6B:
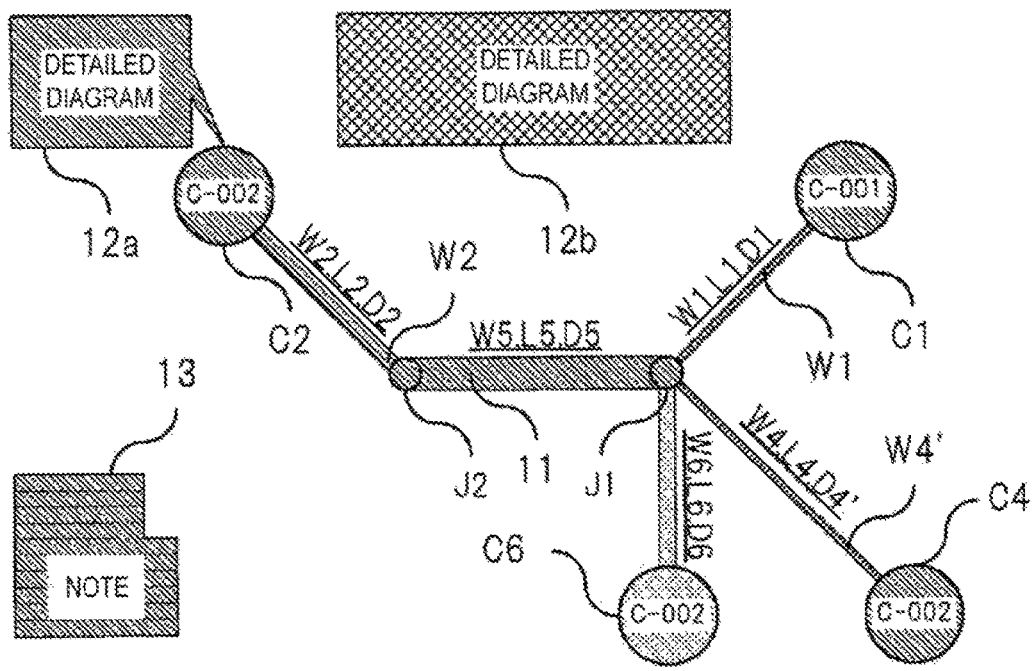
FIG. 6B illustrates a display example of a second product drawing in which statuses of a wire harness, a detailed diagram, and notes are shown clearly.

The processes in the above (B4) to (B6) are performed on each of the object information Y and the object information Z described on the first product drawing, and the process of extracting the detailed diagrams and the notes is finished. As a result of the extraction process, in the first product drawing and the second product drawing, a detailed diagram and a note whose shapes do not match each other between the two product drawings are maintained to be orange as a display color which is in through the processes in the above (B2) and (B3). On the other hand, display colors of a detailed diagram and a note whose shapes match each other between the two product drawings are changed to gray through the processes in the above (B5) and (B6). FIG. 6A illustrates a display example of the first product drawing in which the wire harness, the detailed diagram, and the note are explicitly shown, and FIG. 6B illustrates a display example of the second product drawing in which the wire harness, the detailed diagram, and the note are explicitly shown. FIGS. 6A and 6B represent differences between the display colors by using the presence or absence of hatching and differences between patterns.

In FIGS. 6A and 6B, it is assumed that the detailed diagram 12b is changed between the first product drawing and the second product drawing. In the display example illustrated in FIG. 6A, the detailed diagram 12b in which a change occurs in the second product drawing is displayed orange (hatching in which lines from the upper right toward the lower left and lines from the upper left toward the lower right intersect each other), and the detailed diagram 12a and the note 13 which are common to the first product drawing and the second product drawing are displayed gray (hatching from the upper left toward the lower right). On the other hand, in the display example illustrated in FIG. 6B, the detailed diagram 12b in which a change occurs in the second product drawing is displayed orange (hatching in which lines from the upper right toward the lower left and lines from the upper left toward the lower right intersect each other), and the detailed diagram 12a and the note 13 which are common to the first product drawing and the second product drawing are displayed gray (hatching from the upper left toward the lower right).

In the above-described manner, the analyst who visually recognizes the first product drawing or the second product drawing in which the statuses are explicitly displayed can specify the changes of the detailed diagrams and the note described on the first product drawing in the second product drawing, and the changes of the detailed diagrams and the note described on the second product drawing from the first product drawing. As a result, it is possible to easily identify only a location in which a change occurs among the detailed diagrams and the notes described on the product drawings. This enables the analyst to check only a detailed diagram and a note which are displayed orange, and thus it is possible to reduce an effort required in the checking work.

Figure 7A:
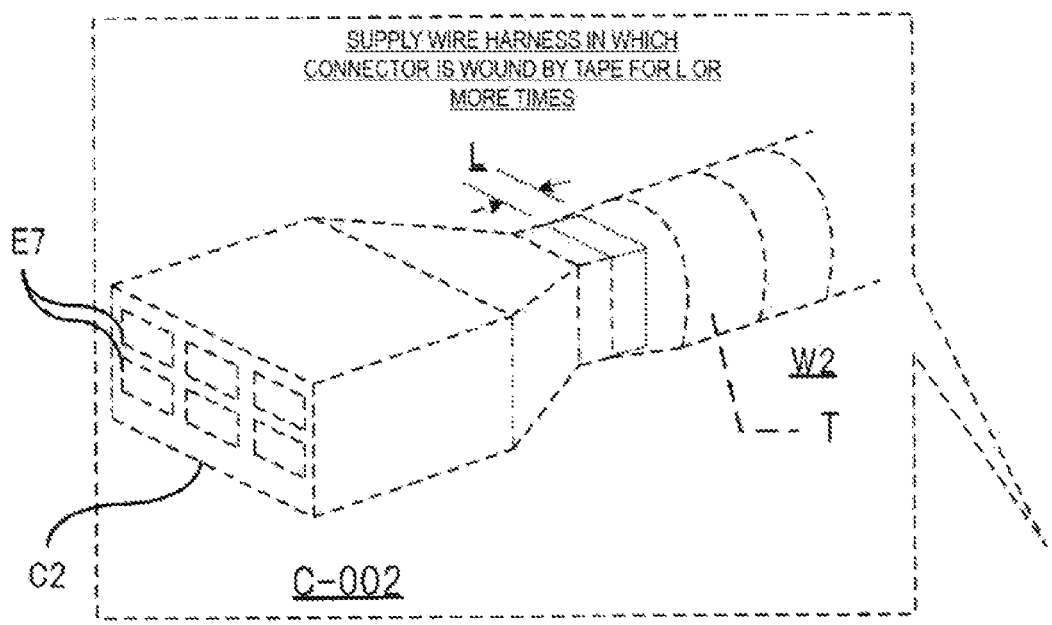
FIGS. 7A and 7B are display examples of a detailed diagram in the product drawing.

In addition, in [Details of non-corresponding graphic data comparison phase], a case has been described in which, if a change of the detailed diagram 12a occurs in the second product drawing, the detailed diagrams 12a described on the first product drawing and the second product drawing are displayed orange. When the detailed diagram 12a in which the change occurs is displayed, the entire detailed diagram 12a in which the change occurs may be displayed orange. Specifically in a case where some elements of the object information Y describing a certain detailed diagram are different from each other between the first product drawing and the second product drawing, all the elements of the object information Y are displayed orange. For example, in a case where, in the detailed diagram illustrated in FIG. 2A, shapes and the number of elements E7 indicating cavity openings of the connector C2 are changed as in a detailed diagram illustrated in FIG. 7A, all elements of the object information Y including the elements E7 are displayed orange (orange is represented by dotted lines in FIG. 7A).

Figure 7B:
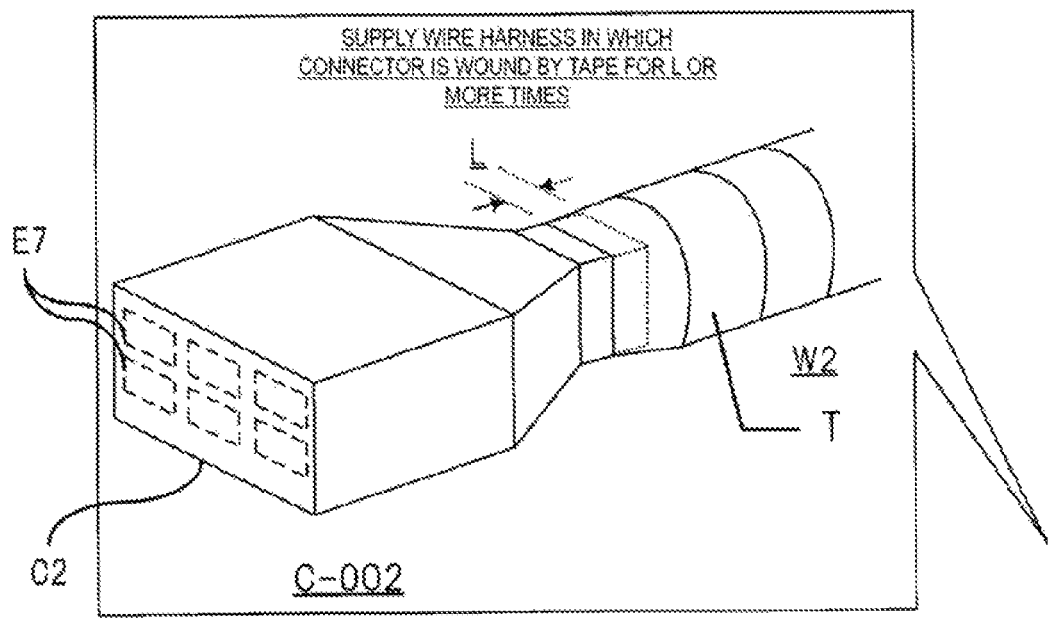

Alternatively, only a changed location of the detailed diagram 12a in which a change occurs may be displayed orange, and portions other than the changed location of the detailed diagram 12a may be displayed gray. Specifically, in a case where some elements of the object information Y describing a certain detailed diagram are different from each other between the first product drawing and the second product drawing, some elements of the object information Y are displayed orange, and other elements are displayed gray. For example, in a case where, in the detailed diagram illustrated in FIG. 2A, shapes and the number of the elements E7 indicating the cavity openings of the connector C2 are changed as in a detailed diagram illustrated in FIG. 7B, the elements E7 are displayed orange, and the other elements of the object information Y are displayed gray (orange is represented by dotted lines, and gray is represented by solid lines in FIG. 7A).

[Details of Comparison Phase by Visual Observation]

Figure 8A:
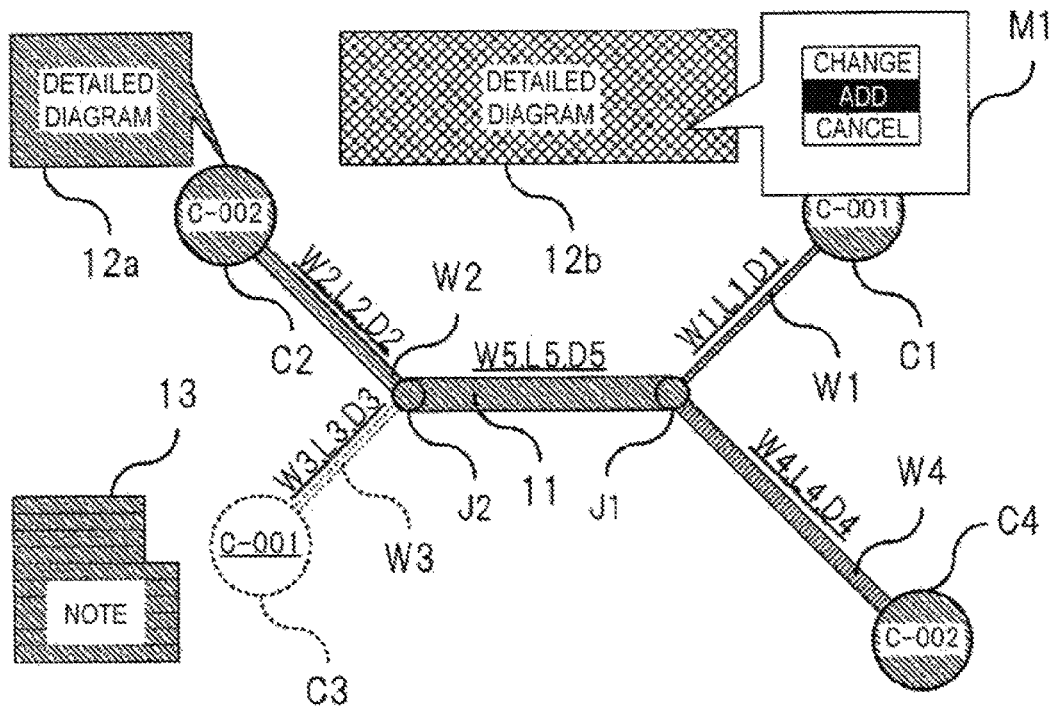
FIG. 8A illustrates a display example of a first product drawing.
Figure 8B:
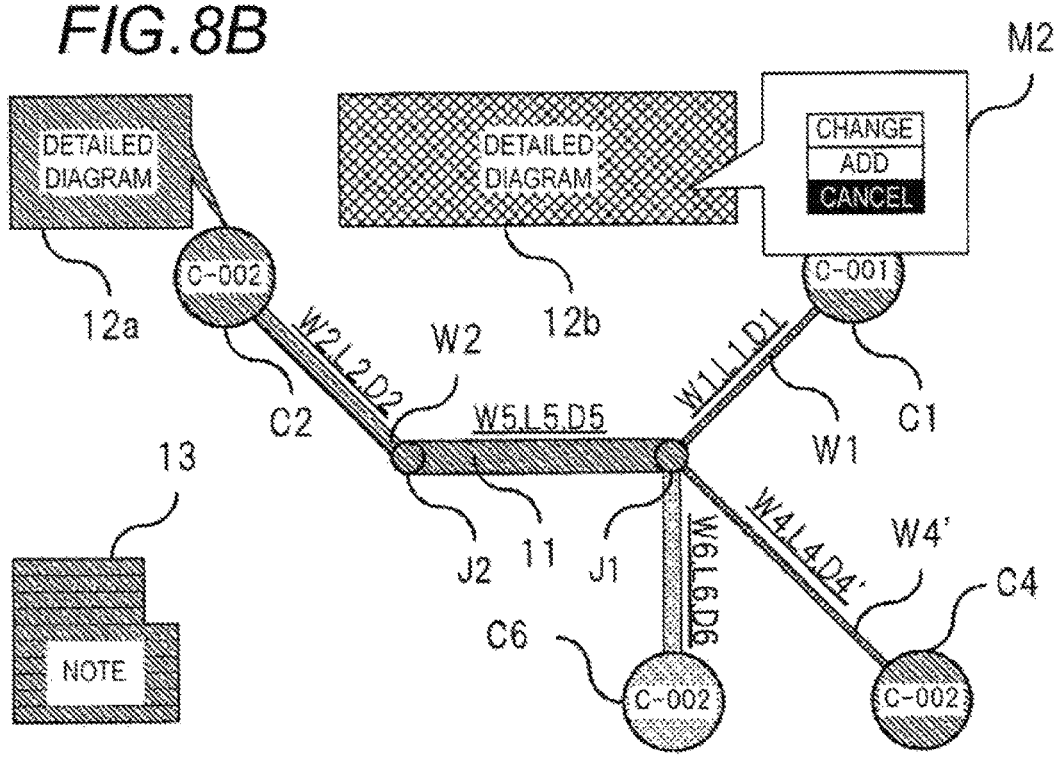
FIG. 8B illustrates a display example of a second product drawing.

In the product drawing which is output through the attribute data comparison phase and the non-corresponding graphic data comparison phase, the wire harness is displayed gray, pink, blue, or green, and the detailed diagrams and the note are displayed gray or orange. In the first product drawing and the second product drawing in which the elements are discriminated from each other by the colors, a changed location between the first product drawing and the second product drawing is identified, but the content of the change, that is, whether or not the change compared with the first product drawing partially occurs, whether or not a member is canceled in the second product drawing, or whether or not a member is added to the second product drawing cannot be identified. For this reason, the analyst is required to determine the content of the change by checking the detailed diagrams and the notes. The comparison phase by visual observation is aimed at assisting the analyst with work for determining the content of changes of the detailed diagrams and the notes. Hereinafter, the comparison phase by visual observation will be described with reference to FIGS. 8A and 8B.

The analyst may designate the detailed diagram which is displayed orange in a state in which the product drawings built through the attribute data comparison phase and the non-corresponding graphic data comparison phase are displayed on a monitor. For example, the detailed diagram is designated by operating a mouse connected to the analysis device so as to put a pointer on the detailed diagram and by clicking the mouse.

If an input operation of designating the detailed diagram which is displayed orange is received from the analyst, the analysis device displays menus M1 and M2 for prompting selection among whether or not a partial change occurs compared with the first product drawing, whether or not a member is added to the second product drawing, and whether or not a member is canceled in the second product drawing, in relation to the detailed diagram designated by the analyst. In the display example of the first product drawing illustrated in FIG. 8A, an item "changed" for notifying the analysis device that the detailed diagram 12b is designated by the analyst and a partial change occurs therein compared with the first product drawing, and an item "canceled" for notifying the analysis device that the detailed diagram 12b is canceled in the second product drawing, are displayed so as to be selected by using the menu M1 (in addition, an item "added" for notifying the analysis device that the detailed diagram is added to the second product drawing is displayed so as not to be selected). Further, in the display example of the second product drawing illustrated in FIG. 8B, an item "changed" for notifying the analysis device that the detailed diagram 12b is designated by the analyst and a partial change occurs therein from the first product drawing, and an item "added" for notifying the analysis device that the detailed diagram 12b is added to the second product drawing, are displayed so as to be selected by using the menu M2 (in addition, an item "canceled" for notifying the analysis device that the detailed diagram is canceled in the second product drawing is displayed so as not to be selected).

If an input operation of designating any one of the items of the menus M1 and M2 is received from the analyst, the analysis device changes the display color of the detailed diagram 12b to a color corresponding to the designated item. If an input operation of designating the item "changed" is received, the analysis device changes the display color of the detailed diagram 12b to pink; if an input operation of designating the item "added" is received, the analysis device changes the display color of the detailed diagram 12b to green; and if an input operation of designating the item "canceled" is received, the analysis device changes the display color of the detailed diagram 12b to blue.

The analyst causes the series of processes to be performed on all the non-corresponding graphic data items (that is, the detailed diagram and the note) displayed orange. In this case, when the analyst performs an input operation on any non-corresponding graphic data, a display color of the non-corresponding graphic data is changed to colors other than orange. As a result, the analyst may perform input operations on the non-corresponding graphic data items until the non-corresponding graphic data items displayed orange disappear without storing the non-corresponding graphic data on which the input operation has been performed. Therefore, it is possible to efficiently perform work for determining the content of changes of the detailed diagrams and the notes.

As described above, the changes extraction algorithm executed by the analysis device according to the embodiment of the present invention has been described in detail. Since the analysis device according to the embodiment of the present invention executes the attribute data comparison phase, the non-corresponding graphic data comparison phase, and the comparison phase by visual observation in this order, the analyst can recognize changes occurring in the second product drawing compared with the first product drawing while viewing the first product drawing and the second product drawing which are output to the monitor of the analysis device, and also can easily add and write the content (changed, added, and canceled) of the changes to and on the product drawings as data. For this reason, according to the present invention, the analyst can extract changes of the product drawings in a short period of time and can also be prevented from forgetting to extract the changes.

In the embodiment of the present invention, an explanation is made of an aspect of sequentially executing the attribute data comparison phase, the non-corresponding graphic data comparison phase, and the comparison phase by visual observation. In this aspect, it is possible to display the corresponding graphic data and the non-corresponding graphic data in the product drawing, with the series of processes. In the series of processes, by executing the attribute data comparison phase, the corresponding graphic data is extracted in the attribute data comparison phase, and the non-corresponding graphic data which remains without being extracted in the attribute data comparison phase is a target for data processing in the non-corresponding graphic data comparison phase. Accordingly it is possible to extract the non-corresponding graphic data surely and efficiently. In some special circumstances, there may be a case where attribute data does not exist in the product drawing, i.e., there may be a case where only the non-corresponding graphic data is described in the product drawing without the description of the corresponding graphic data. Even in this case, it is possible to surely extract the non-corresponding graphic data with the above described series of processes. In this way, the above described series of processes can be executed regardless of the existence of the attribute data in the product drawing.

Alternatively, when it is known that the comparison of the attribute data is not necessary because only the non-corresponding graphic data is described in the product drawing without the description of the attribute data in the product drawing, it is also possible that only the non-corresponding graphic data is displayed without the display of the corresponding graphic data in the product drawing, and confirmation of the changes of the non-corresponding graphic data is performed. In this case, it is sufficient that only the non-corresponding graphic data comparison phase and the comparison phase by visual observation are executed in this order without the execution of the attribute data comparison phase. Accordingly, the attribute data comparison phase is inessential to the present invention.

[Details of Modification Example of Changes Extraction Algorithm]

In the changes extraction algorithm executed by the analysis device according to the embodiment of the present invention, the attribute data comparison phase may be executed as follows. Hereinafter, a modification example of the attribute data comparison phase will be described. When compared with the changes extraction algorithm described in the item [Details of changes extraction algorithm], there is a difference in that a process in an attribute data comparison phase (A0) is added, and thus the processes in the above (A1) to (A2-5) are changed.

[Details of Modification Example of Attribute Data Comparison Phase]

In a modification example of the attribute data comparison phase, a wire harness is built on the second product drawing by performing the following processes.

(A0) All the first corresponding graphic data items are displayed in a second display color on the first product drawing by referring to the first attribute data described on the first product drawing. In addition, all the second corresponding graphic data items are displayed in the second display color on the second product drawing by referring to the second attribute data described on the second product drawing.

(A1) Matching or mismatching with the second attribute data described on the second product drawing, and the extent of matching if the matching occurs are determined by referring to the first attribute data described on the first product drawing.

(A2-1) In a case where there is the second attribute data which completely matches the first attribute data, a display color of the first corresponding graphic data correlated with the first attribute data is changed to a first display color, and the first corresponding graphic data is displayed on the first product drawing.

(A2-2) In a case where there is the second attribute data which completely matches the first attribute data, a display color of the second corresponding graphic data correlated with the second attribute data is changed to the first display color, and the second corresponding graphic data is displayed on the second product drawing.

(A2-3) In a case where there is the second attribute data which partially matches the first attribute data, a display color of the first corresponding graphic data correlated with the first attribute data is changed to a third display color, and the first corresponding graphic data is displayed on the first product drawing.

(A2-4) In a case where there is the second attribute data which partially matches the first attribute data, a display color of the second corresponding graphic data correlated with the second attribute data is changed to the third display color, and the second corresponding graphic data is displayed on the second product drawing.

(A2-5) In a case where it is determined that the second attribute data has no data matching the first attribute data, the first corresponding graphic data correlated with the first attribute data is displayed in a fourth display color which is different from the first display color and the third display color on the first product drawing.

First, in the process in the above (A0) the first corresponding graphic data is drawn on the first product drawing. At this time, the first corresponding graphic data is displayed orange as a display color. In addition, the second corresponding graphic data is drawn on the second product drawing. At this time, the second corresponding graphic data is displayed orange as a display color.

In the process in the above (A1), matching or mismatching between the first attribute data and the second attribute data, and the extent of matching if the matching occurs are determined. In addition, the process in the above (A1) is the same as described in [Details of attribute data comparison phase], and thus detailed description thereof will be omitted here.

In the process in the above (A2-1), the first corresponding graphic data is drawn on the first product drawing by referring to the function information correlated with the first attribute data which completely matches the second attribute data. At this time, the first corresponding graphic data is drawn by changing the display color thereof from orange to gray. As a result, when the first product drawing is output, the second corresponding graphic is displayed gray, which indicates the same member without any change in the second product drawing.

In the process in the above (A2-2), the second corresponding graphic data is drawn on the second product drawing by referring to the function information correlated with the second attribute data which completely matches the first attribute data. At this time, the second corresponding graphic data is drawn by changing the display color thereof from orange to gray. As a result, when the second product drawing is output, the second corresponding graphic data is displayed gray which indicates the same member without any change compared with the first product drawing.

In the process in the above (A2-3), the first corresponding graphic data is drawn on the first product drawing by referring to the function information correlated with the first attribute data which partially matches the second attribute data. At this time, the first corresponding graphic data is drawn by changing the display color thereof from orange to pink. As a result, when the first product drawing is output, the first corresponding graphic data is displayed pink, which indicates a member in which a partial change occurs compared with the first product drawing.

In the process in the above (A2-4), the second corresponding graphic data is drawn on the second product drawing by referring to the function information correlated with the second attribute data which partially matches the first attribute data. At this time, the second corresponding graphic data is drawn by changing the display color thereof from orange to pink. As a result, when the second product drawing is output, the second corresponding graphic data is displayed pink, which indicates a member in which a partial change occurs compared with the first product drawing.

In the process in the above (A2-5), the first corresponding graphic data is drawn on the first product drawing by referring to the function information correlated with the first attribute data. At this time, the first corresponding graphic data is drawn blue as a display color. As a result, when the first product drawing is output, the first corresponding graphic data is displayed blue, which indicates a member which is canceled in the second product drawing.

When the processes in the above (A1) to (A2-4) are performed on each item of the first attribute data described on the first product drawing starting from the process in the above (A0), and the execution of the processes in the above (A1) to (A2-4) on all the items of the first attribute data is completed, the same member without any change compared with the first product drawing is displayed gray a member in which a partial change occurs compared with the first product drawing is displayed pink, and a member which is canceled in the second product drawing is displayed blue, on the first product drawing. On the other hand, on the second product drawing, the same member without any change compared with the first product drawing is displayed gray a member in which a partial change occurs compared with the first product drawing is displayed pink, and a member which is not present in the first product drawing and is added to the second product drawing is not displayed.

Figure 9:
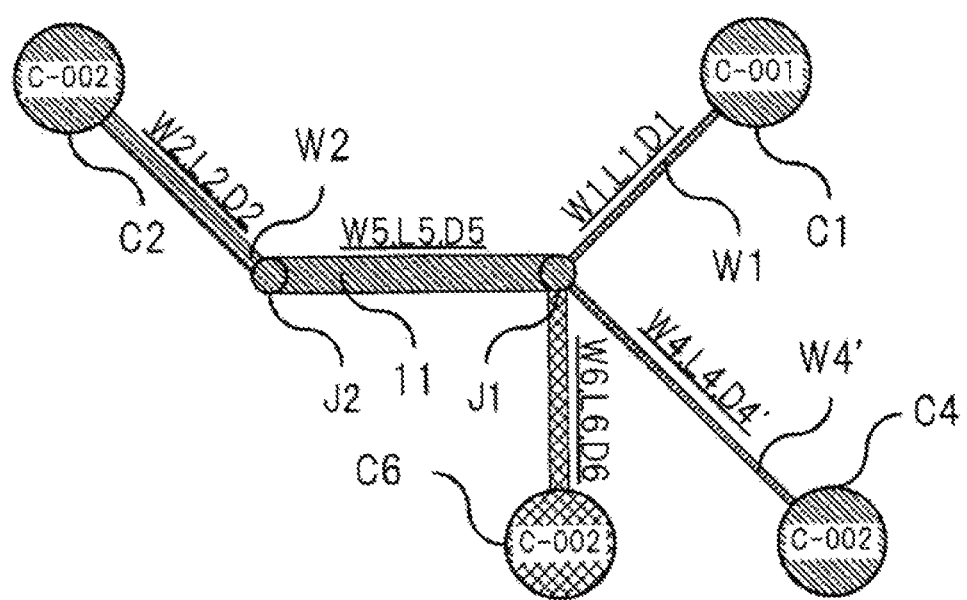
FIG. 9 illustrates a display example of the second product drawing in which a status of the wire harness is shown clearly.

On the second product drawing, a member which is common to the first product drawing is displayed gray a member in which a partial change occurs compared with the first product drawing is displayed pink, and a member which is added to the second product drawing is orange. Therefore, each status is explicitly displayed. FIG. 9 illustrates a display example of the second product drawing in which the statuses of the wire harness are explicitly shown. FIG. 9 represents differences between the display colors by using the presence or absence of hatching and differences between patterns.

In FIG. 9, it is assumed that the diameter of the electric wire W4 is changed from D4 to D4' between the first product drawing and the second product drawing; the electric wire W3 and the connector C3 which are present in the first product drawing are canceled in the second product drawing; and a electric wire W6 and a connector C6 connected to the electric wire W6, which are not present in the first product drawing are added to the second product drawing. In the display example illustrated in FIG. 9, the electric wire W4 in which a partial change occurs in the second product drawing is displayed pink (hatching from the upper right toward the lower left); the electric wire W6 and the connector C6 which are added to the second product drawing are displayed orange (hatching in which lines from the upper right toward the lower left a Id lines from the upper left toward the lower right intersect each other); and other members common to the first product drawing and the second product drawing are displayed gray (hatching from the upper left toward the lower right).

In the above-described manner, the analyst who visually recognizes the second product drawing in which the statuses are explicitly displayed can specify the difference between the wire harness described on the first product drawing and the wire harness described on the second product drawing at a glance, that is, can recognize the partially changed member or the added member.

In [Modification example of attribute data comparison phase], all the second corresponding graphic data items described on the second product drawing are temporarily displayed orange through the process in the above (A0). For this reason, the second corresponding graphic data excluding the second corresponding graphic data which is displayed gray through the process in the above (A2-2) and the second corresponding graphic data which is displayed pink through the process in the above (A2-4) is still displayed orange. In the above-described way, it is possible to identify a member which is not present in the first product drawing and is added to the second product drawing at a glance. As mentioned above, the analyst can visually recognize the member added to the second product drawing, and may be caused to prompt an input operation on the corresponding graphic data which is displayed orange in "Comparison phase by visual observation" described above.

In addition, in [Modification example of attribute data comparison phase], when the process in the above (A0) is performed, the processes in the above (B1) to (B3) of [Details of non-corresponding graphic data comparison phase] may be performed. In other words, both of the first corresponding graphic data and the first non-corresponding graphic data may be displayed in the second display color (that is, orange) on the first product drawing, and both of the second corresponding graphic data and the second non-corresponding graphic data may be displayed in the second display color (that is, orange) on the second product drawing. If the process is performed in the above-described way, the number of targets which are displayed orange is reduced whenever the processes in the above (A1) to (A2-5) and the processes in the above (B4) to (B6) are completed from the start of the attribute data comparison phase to the end of the non-corresponding graphic data comparison phase. As a result, a target which is still displayed orange is processed in the comparison phase by visual observation. Through the series of processes, the analyst can be guided from the attribute data comparison phase to the comparison phase by visual observation, and thus it is possible to provide a more preferable user interface.

[Application Examples of Changes Extraction Algorithm]

[Application Example 1]

Figure 10A:
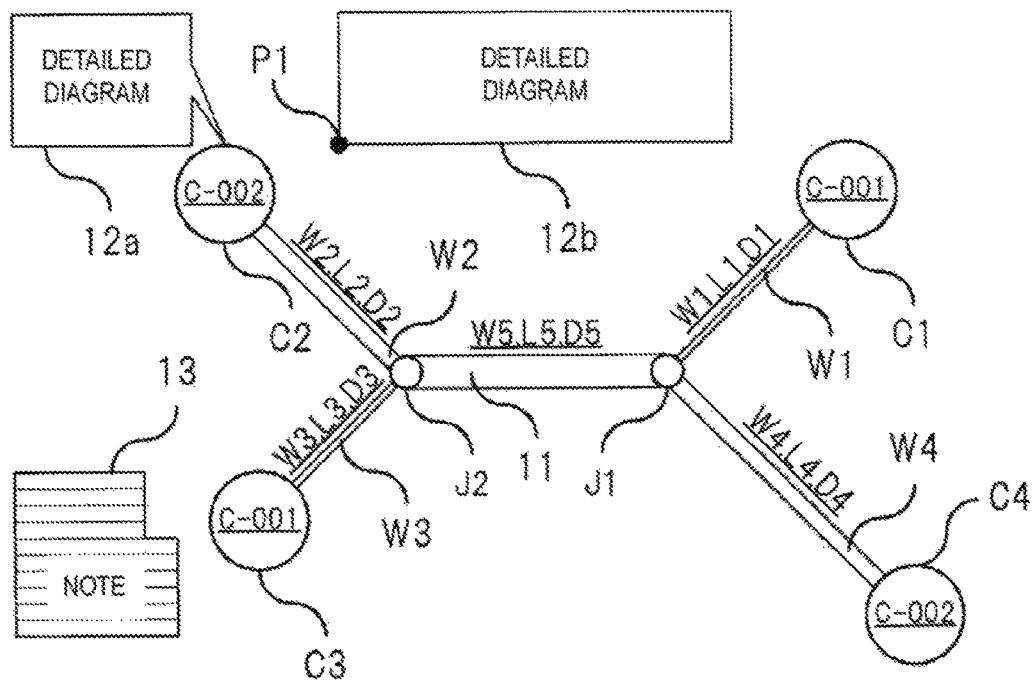
FIG. 10A illustrates a display example of a first product drawing.
Figure 10B:
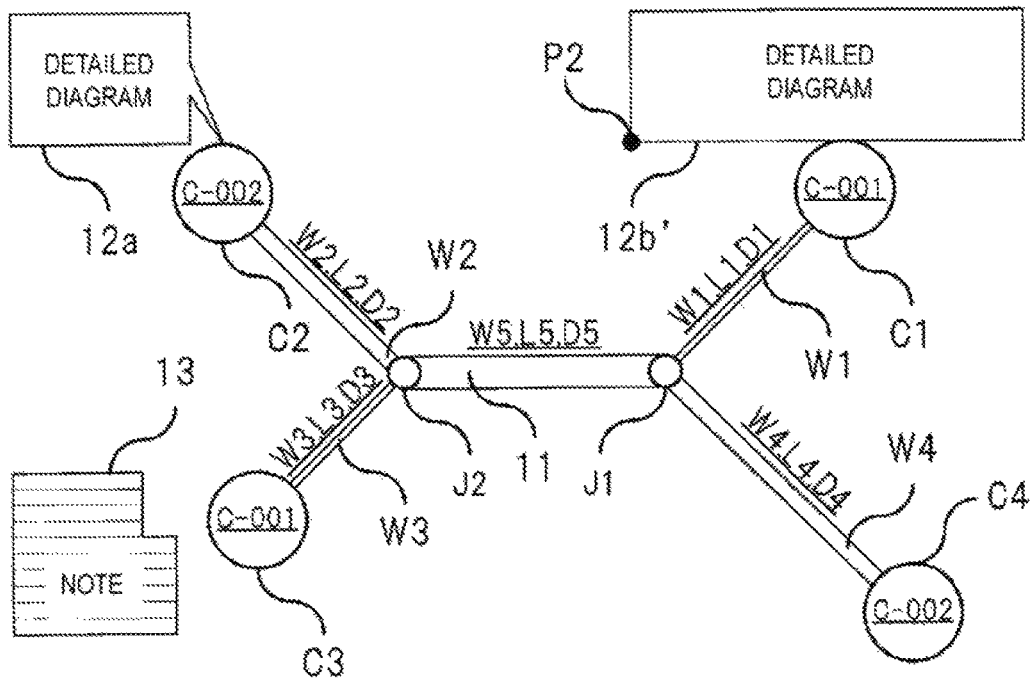
FIG. 10B illustrates a display example of a second product drawing.

In [Details of non-corresponding graphic data comparison phase] of [Details of changes extraction algorithm], it has been described that when matching or mismatching with the object information Y described on the second product drawing is determined by referring to the object information Y described on the first product drawing, and matching or mismatching of the attribute information and the function information of each element are determined (the process in the above (B4)). In a case where matching or mismatching of the object information Y is determined through this process, the following problem may occur. In other words, in a case where a position of the detailed diagram 12$b$ described on the first product drawing illustrated in FIG. 10A is different from a position of the detailed diagram 12$b'$ described on the second product drawing illustrated in FIG. 10B, it is determined that the object information Y of the detailed diagram 12$b$ mismatches the object information Y of the detailed diagram 12$b'$ even if elements drawn on the detailed diagrams are the same as each other.

Meanwhile, on the product drawing, the detailed diagram and the note are drawn in empty regions of the product drawing in which a developed wire harness is not drawn. For this reason, if a shape of the wire harness drawn on the product drawing is changed, and a shape and a position of the empty region of the product drawing are changed, there is a case where the whole of the detailed diagram and the note may be changed without elements regarding the content of the detailed diagram and the note being changed. In this case, in the related art, an analyst specifies positions where detailed diagrams or notes before and after being changed are drawn, and also checks elements regarding the content since the elements regarding the content of the detailed diagrams or the notes are not necessarily the same as each other.

Therefore, the following function is added in the non-corresponding graphic data comparison phase to the changes extraction algorithm executed by the analysis device according to the embodiment of the present invention, and thus it is possible to reduce a burden of analysis work performed by the analyst.

(B7) After the process in the above (B5), an input operation of designating any one of the first non-corresponding graphic data items which are displayed in the second display color on the first product drawing is received.

(B8) After the process in the above (B6), an input operation of designating any one of the second non-corresponding graphic data items which are displayed in the second display color on the second product drawing is received.

(B9) A reference position P1 is set in the first non-corresponding graphic data, a reference position P2 is set in the second non-corresponding graphic data, and matching or mismatching between each element shaping the first non-corresponding graphic data and each element shaping the second non-corresponding graphic data is determined in a state in which the reference positions P1 and P2 match each other.

(B5') In a case where each element shaping the first non-corresponding graphic data matches each element shaping the second non-corresponding graphic data, the first non-corresponding graphic data is displayed in the first display color on the first product drawing.

(B6') In a case where each element shaping the first non-corresponding graphic data matches each element shaping the second non-corresponding graphic data, the second non-corresponding graphic data is displayed in the first display color on the second product drawing.

In the processes in the above (B7) and (B8), the analyst may designate the detailed diagram or the note which is displayed orange in a state in which the product drawings are displayed on the monitor. For example, the detailed diagram or the note is designated by operating the mouse connected to the analysis device so as to put a pointer on the detailed diagram or the note and by clicking the mouse.

In the process in the above (B9), in the designated detailed diagram or note, a point which is located on the lowermost side in an element which is drawn on the leftmost side is set as a reference position. A reference position of the detailed diagram 12$b$ is P1 in FIG. 10A, and a reference of the detailed diagram 12$b'$ is P2 in FIG. 10B. In addition, a set reference position is not limited to the lower left side, and may be set in the first non-corresponding graphic data and the second non-corresponding graphic data based on a predetermined rule. Function information of each element shaping the first non-corresponding graphic data and function information of each element shaping the second non-corresponding graphic data are rewritten at drawing positions obtained when the reference positions P1 and P2 are used as references, and matching or mismatching between each element shaping the first non-corresponding graphic data and each element shaping the second non-corresponding graphic data is determined.

In the process in the above (B5'), in a case where each element shaping the first non-corresponding graphic data matches each element shaping the second non-corresponding graphic data, the first non-corresponding graphic data is displayed gray as a display color on the first product drawing. As a result, when the first product drawing is output, the first non-corresponding graphic data is displayed gray, which indicates the detailed diagram without any change compared with the first product drawing.

In the process in the above (B6'), in a case where each element shaping the first non-corresponding graphic data matches each element shaping the second non-corresponding graphic data, the second non-corresponding graphic data is displayed gray on the second product drawing. As a result, when the second product drawing is output, the second non-corresponding graphic data is displayed gray, which indicates the detailed diagram without any change compared with the second product drawing.

As mentioned above, even if the whole of the detailed diagram and the note is changed without the elements regarding the content of the detailed diagram and the note being changed, the analyst can accurately add and write the presence or absence of changes on the product drawings as data while viewing the first product drawing and the second product drawing which are output to the monitor of the analysis device. For this reason, according to the present invention, the analyst can extract changes of the product drawings in a short period of time and can also be prevented from forgetting to extract the changes.

[Modification Example 2]

In [Details of non-corresponding graphic data comparison phase] of [Details of changes extraction algorithm], it has been described that when matching or mismatching with the object information Y described on the second product drawing is determined by referring to the object information Y described on the first product drawing, and matching or mismatching of the attribute information and the function information of each element are determined (the process in the above (B4)). In a case where matching or mismatching of the object information Y is determined through this process, the following problem may occur. In other words, in a case where an element shaping the detailed diagram $12b$ described on the first product drawing illustrated in FIG. 11A and an shaping the detailed diagram $12b'$ described on the second product drawing illustrated in FIG. 11B have the same shape but are drawn at different positions, it is determined that the object information Y of the detailed diagram $12b$ mismatches the object information Y of the detailed diagram $12b'$.

As described in [Modification Example 1], on the product drawing, the detailed diagram and the note are drawn in empty regions of the product drawing in which a developed wire harness is not drawn. For this reason, if a shape of the wire harness drawn on the product drawing is changed, and a shape and a position of the empty region of the product drawing are changed, there is a case where shapes of elements regarding the content of the detailed diagram and the note may be the same but positions where the elements are drawn may be changed. In this case, in the related art, an analyst checks elements regarding the content of the detailed diagram or the note.

Therefore, the following function is added in the non-corresponding graphic data comparison phase to the changes extraction algorithm executed by the analysis device according to the embodiment of the present invention, and thus it is possible to reduce a burden of analysis work performed by the analyst.

(B10) After the process in the above (B5), an input operation of designating any one of the first non-corresponding graphic data items which are displayed in the second display color on the first product drawing, and an input operation of designating any element of the designated first non-corresponding graphic data are received.

(B11) After the process in the above (B6), an input operation of designating any one of the second non-corresponding graphic data items which are displayed in the second display color on the second product drawing, and an input operation of designating any element of the designated second non-corresponding graphic data are received.

(B12) A reference position P1 is set in a set of elements designated from the first non-corresponding graphic data, a reference position P2 is set in a set of elements designated from the second non-corresponding graphic data, and matching or mismatching between the set of elements designated from the first non-corresponding graphic data and the set of elements designated from the second non-corresponding graphic data is determined in a state in which the reference positions P1 and P2 match each other.

(B5") In a case where the set of elements designated from the first non-corresponding graphic data matches the set of elements designated from the second non-corresponding graphic data, the set of elements designated from the first non-corresponding graphic data is displayed in the first display color on the first product drawing.

(B6") In a case where the set of elements designated from the first non-corresponding graphic data matches the set of elements designated from the second non-corresponding graphic data, the set of elements designated from the second non-corresponding graphic data is displayed in the first display color on the second product drawing.

In the processes in the above (B10) and (B11), the analyst may designate the detailed diagram or the note which is displayed orange in a state in which the product drawings are displayed on the monitor. For example, the detailed diagram or the note is designated by operating the mouse connected to the analysis device so as to put a pointer on the detailed diagram or the note and by clicking the mouse. In addition, the analyst may designate some elements constituting the detailed diagram detailed diagram or note. For example, the mouse connected to the analysis device is operated, and a set of elements located within a region selected as a range with a pointer are designated.

Figure 11A:
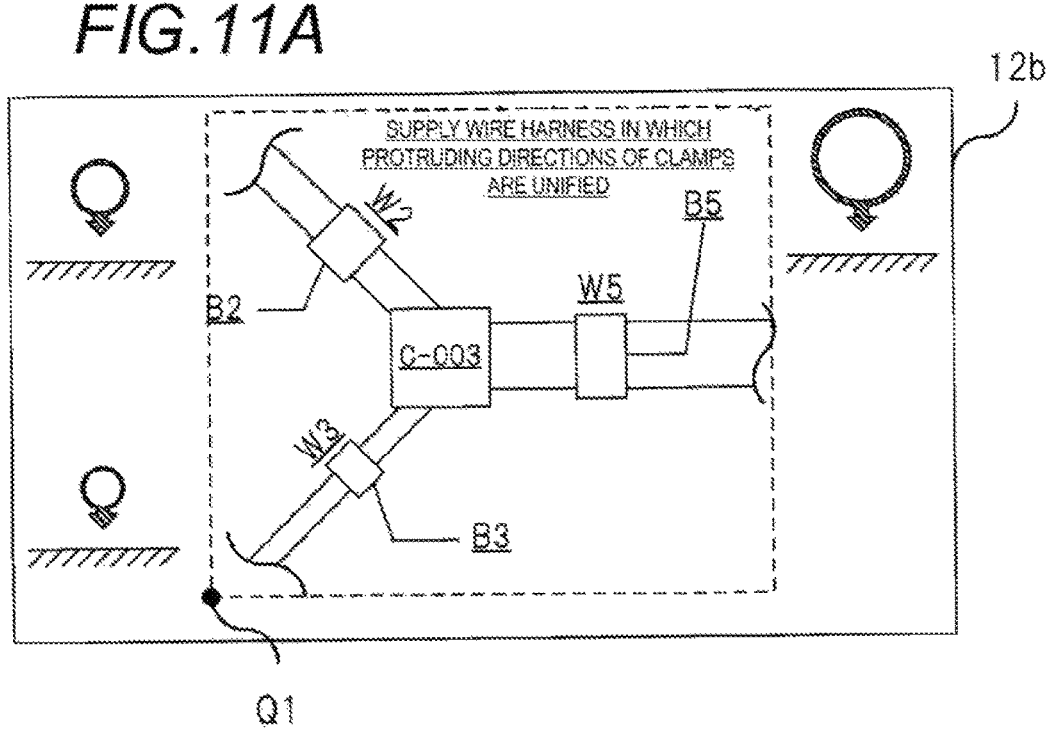
FIG. 11A illustrates a display example of a detailed diagram in the first product drawing.
Figure 11B:
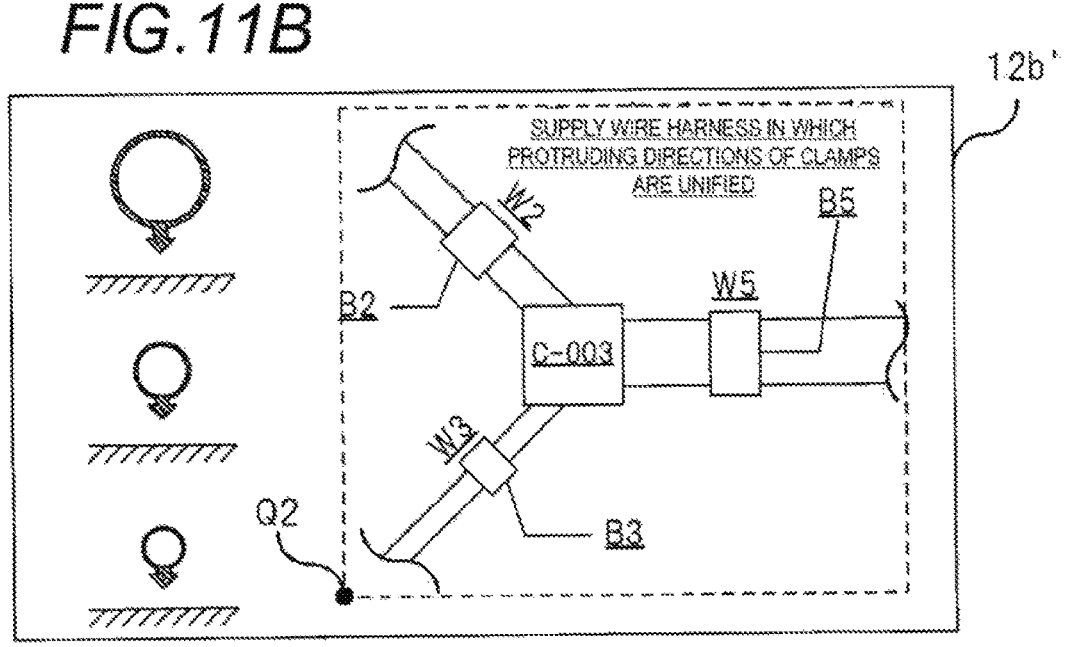
FIG. 11B illustrates a display example of a detailed diagram in the second product drawing.

In the process in the above (B12), in the designated set of elements, a point located on the lower left side in the smallest rectangular shape (a rectangular shape drawn with a dotted line FIGS. 11A and 11B) surrounding the designated set of elements is set as a reference position. In FIG. 11A, the lower left side of a rectangular shape drawn with a dotted line is a reference position Q1, and, in FIG. 11B, the lower left side of a rectangular shape drawn with a dotted line is a reference position Q2. In addition, a set reference position is not limited to the lower left side, and may be set in the first non-corresponding graphic data and the second non-corresponding graphic data based on a predetermined rule. Function information of each element designated from the first non-corresponding graphic data and function information of each element designated from the second non-corresponding graphic data are rewritten at drawing positions obtained when the reference positions Q1 and Q2 are used as references, and matching or mismatching between each element designated from the first non-corresponding graphic data and each element designated from the second non-corresponding graphic data is determined.

In the process in the above (B5"), in a case where each element designated from the first non-corresponding graphic data matches each element designated from the second non-corresponding graphic data, each element designated from the first non-corresponding graphic data is displayed gray as a display color on the first product drawing. As a result, when the first product drawing is output, the first non-corresponding graphic data is displayed gray which indicates that the element designated from the detailed diagram is not changed.

In the process in the above (B6"), in a case where each element designated from the first non-corresponding graphic data matches each element designated from the second non-corresponding graphic data, each element designated from the second non-corresponding graphic data is displayed gray as a display color on the second product drawing. As a result, when the second product drawing is output, the second non-corresponding graphic data is displayed gray, which indicates that the element designated from the detailed diagram is not changed.

As mentioned above, even if the elements regarding the content of the detailed diagram and the note are changed, the analyst can accurately add and write the presence or absence of changes on the product drawings as data while viewing the first product drawing and the second product drawing which are output to the monitor of the analysis device. For this reason, according to the present invention, the analyst can extract changes of the product drawings in a short period of time and can also be prevented from forgetting to extract the changes.

As mentioned above, according to the analysis device, the analysis method, and the program of the present invention, an analyst can recognize changes occurring in the second product drawing compared with the first product drawing while viewing the first product drawing and the second product drawing which are output to the monitor of the analysis device, and also can easily add and write the content (changed, added, and canceled) of the changes to and on the product drawings as data. For this reason, the analyst can extract changes of the product drawings in a short period of time and can also be prevented from forgetting to extract the changes.

Here, features of the analysis device, the analysis method, and the program according to the embodiment of the present invention are collected briefly and are listed in the following (1) to (9).

(1) An analysis device including:
an input unit (401) that receives an input operation from an analyst;
a display unit (405) that displays a product drawing;
a recording unit (database unit 402) that records first attribute data correlated with each member constituting a first wire harness, first corresponding graphic data correlated with the first attribute data, and first non-corresponding graphic data which is not correlated with the first attribute data, wherein the first attribute data, the first corresponding graphic data and the first non-corresponding data are included in a first product drawing as information, and records second attribute data correlated with each member constituting a second wire harness, second corresponding graphic data correlated with the second attribute data, and second non-corresponding graphic data which is not correlated with the second attribute data, wherein the second attribute data, the second corresponding graphic data and the second non-corresponding data are included in a second product drawing as information; and
a control unit (processing unit 406) that performs control of referring to the information included in the product drawings recorded in the recording unit, of building a part of or an entire wire harness by drawing corresponding graphic data of each member constituting the wire harness, of adding non-corresponding graphic data to the built wire harness, and of displaying the product drawings on the display unit,
wherein, when the control unit causes the second product drawing to be displayed on the display unit, the control unit compares the first non-corresponding graphic data with the second non-corresponding graphic data, and displays in a discriminable manner the second non-corresponding graphic data which completely matches the first non-corresponding graphic data and the second non-corresponding graphic data which does not completely match the first non-corresponding graphic data.

(2) The analysis device according to the above (1),
wherein, when the control unit causes the second product drawing to be displayed on the display unit, the control unit further displays the second corresponding graphic data and the second non-corresponding graphic data in a discriminable manner.

(3) The analysis device according to the above (1) or (2),
wherein the control unit compares the first non-corresponding graphic data and the second non-corresponding graphic data with each other of which a drawing position on the first product drawing and a drawing position on the second product drawing match each other.

(4) The analysis device according to the above (1) or (2),
wherein the control unit displays the first product drawing on the display unit,
the input unit receives an input operation of designating the first non-corresponding graphic data from the first product drawing displayed on the display unit, and an input operation of designating the second non-corresponding graphic data from the second product drawing displayed on the display unit, and
the control unit compares the first non-corresponding graphic data and the second non-corresponding graphic data with each other, designated based on the input operations received by the input unit.

(5) The analysis device according to any one of the above (1) to (4),
wherein, when the control unit causes the second product drawing to be displayed on the display unit, the control unit compares the first non-corresponding graphic data with the second non-corresponding graphic data, and displays, in a first display color (gray), the second non-corresponding graphic data which completely matches the first non-corresponding graphic data, and displays, in a second display color (orange), the second non-corresponding graphic data which does not completely match the first non-corresponding graphic data.

(6) The analysis device according to the above (5),
wherein the input unit receives an input operation of designating the second non-corresponding graphic data which is displayed in the second display color, and an input operation of changing a display color to a third display color (pink) or a fourth display color (blue or green), and
the control unit changes a display color of the second non-corresponding graphic data designated based on the input operation received by the input unit to the third display color or the fourth display color.

(7) An analysis method including:
referring to first attribute data correlated with each member constituting a first wire harness, first corresponding graphic data correlated with the first attribute data, and first non-corresponding graphic data which is not correlated with the first attribute data, wherein the first attribute data, the first corresponding graphic data and the first non-corresponding data are included in a first product drawing as information, and referring to second attribute data correlated with each member constituting a second wire harness, second corresponding graphic data correlated with the second attribute data, and second non-corresponding graphic data which is not correlated with the second attribute data, wherein the second attribute data, the second corresponding graphic data and the second non-corresponding data are included in a second product drawing as information;

building a part of or an entire wire harness by drawing corresponding graphic data of each member constituting the wire harness;

adding non-corresponding graphic data to the built wire harness; and displaying the product drawings, wherein the first non-corresponding graphic data is compared with the second non-corresponding graphic data, and the second non-corresponding graphic data which completely matches the first attribute data and the second non-corresponding graphic data which does not completely match the first non-corresponding graphic data are displayed in a discriminable manner.

(8) The analysis method according to the above (7), wherein the second corresponding graphic data and the second non-corresponding graphic data are displayed in a discriminable manner.

(9) A program causing a computer to execute each procedure of the analysis method according to the above (7) or (8).

Although the present invention has been described in detail with reference to the specific embodiment, it is obvious to a person skilled in the art that various medications or alterations may occur without departing from the spirit and the scope of the present invention.

According to the present invention, it is possible by an analyst to extract changes of a product drawing in a short time, and also to reduce the possibility that the analyst forgets to extract the changes. The present invention which achieves the effect is useful in relating to an analysis device, an analysis method, and a program, in which a part of or the entire wire harness is displayed by referring to information included in a product drawing.

What is claimed is:

1. An analysis method comprising:

determining first attribute data for each member of a first wire harness;

determining first corresponding graphic data associated with the first attribute data, and first non-corresponding graphic data which is not associated with the first attribute data, wherein the first corresponding graphic data and the first non-corresponding graphic data are visually incorporated in a first product;

determining second attribute data for each member of a second wire harness;

determining second corresponding graphic data associated with the second attribute data, and second non-corresponding graphic data which is not associated with the second attribute data, wherein the second corresponding graphic data and the second non-corresponding graphic data are visually incorporated in a second product drawing;

storing attribute information of the second corresponding graphic data and function information of the second corresponding graphic data in association with one another for each member of the second wire harness;

generating an image of a part of or an entire wire harness by drawing corresponding graphic data of each member of the second wire harness, wherein generating the image of the part of or the entire wire harness includes:

generating a first portion of the image corresponding to a first member of the second wire harness;

applying an indicator to a stored first piece of second attribute data corresponding to the first member of the second wire harness; and advancing to a stored second piece of the second attribute data not having the indicator;

adding visual representations of the second non-corresponding graphic data to the generated image of the part of or the entire wire harness; and displaying the generated image, wherein the first non-corresponding graphic data is compared with the second non-corresponding graphic data, and the second non-corresponding graphic data which completely matches the first attribute data and the second non-corresponding graphic data which does not completely match the first non-corresponding graphic data are displayed in a visually discriminable manner.

2. The analysis method according to claim 1, wherein the second corresponding graphic data and the second non-corresponding graphic data are displayed in a visually discriminable manner.

3. A non-transitory computer-readable storage medium in which is stored a program causing a computer to execute each procedure of the analysis method according to claim 1.

4. An analysis device comprising:

an input unit that receives an input operation from an analyst;

a display unit that displays a product drawing;

a control unit; and memory storing instructions that, when executed by the control unit, cause the analysis device to perform:

determining first attribute data for each member of a first wire harness;

determining first corresponding graphic data associated with the first attribute data, and first non-corresponding graphic data which is not associated with the first attribute data, wherein the first corresponding graphic data and the first non-corresponding graphic data are visually incorporated in a first product;

determining second attribute data for each member of a second wire harness;

determining second corresponding graphic data associated with the second attribute data, and second non-corresponding graphic data which is not associated with the second attribute data, wherein the second corresponding graphic data and the second non-corresponding graphic data are visually incorporated in a second product drawing;

storing, in the memory, attribute information of the second corresponding graphic data and function information of the second corresponding graphic data in association with one another for each member of the second wire harness;

generating an image of a part of or an entire wire harness by drawing corresponding graphic data of each member of the second wire harness, wherein generating the image of the part of or the entire wire harness includes:

generating a first portion of the image corresponding to a first member of the second wire harness;

applying an indicator to a stored first piece of second attribute data corresponding to the first member of the second wire harness; and advancing to a stored second piece of the second attribute data not having the indicator;

adding visual representations of the second non-corresponding graphic data to the generated image of the part of or the entire wire harness; and displaying the generated image on the display unit, wherein the first non-corresponding graphic data is compared with the second non-corresponding graphic data, and the second non-corresponding graphic data which completely matches the first attribute data and the second non-corresponding graphic data which does not completely match the first non-corresponding graphic data are displayed in a visually discriminable manner in the generated image.

5. The analysis device according to claim 4, wherein, when the second product drawing is displayed on the display unit, the control unit causes the analysis device to display the second corresponding graphic data and the second non-corresponding graphic data in a visually discriminable manner.

6. The analysis device according to claim 4, wherein the instructions, when executed by the control unit, further causes the analysis device to compare the first non-corresponding graphic data and the second non-corresponding graphic data with each other, wherein a drawing position on the first product drawing and a drawing position on the second product drawing match each other.

7. The analysis device according to claim 4, wherein the instructions, when executed by the control unit causes the analysis device to display the first product drawing on the display unit,
wherein the input unit is configured to receive an input operation of designating the first non-corresponding graphic data from the first product drawing displayed on the display unit, and an input operation of designating the second non-corresponding graphic data from the second product drawing displayed on the display unit, and
wherein the instructions, when executed by the control unit, cause the analysis device to compare the designated first non-corresponding graphic data and the designated second non-corresponding graphic data with each other.

8. The analysis device according to claim 4, wherein, when causes the second product drawing is displayed on the display unit, the analysis device compares the first non-corresponding graphic data with the second non-corresponding graphic data, and displays, in a first display color, the second non-corresponding graphic data which completely matches the first non-corresponding graphic data, and displays, in a second display color, the second non-corresponding graphic data which does not completely match the first non-corresponding graphic data.

9. The analysis device according to claim 8, wherein the input unit is configured to receive an input operation of designating the second non-corresponding graphic data which is displayed in the second display color, and an input operation of changing a display color to a third display color or a fourth display color, and
wherein the instructions, when executed by the control unit, cause the analysis device to change a display color of the second non-corresponding graphic data designated based on the input operation received by the input unit to the third display color or the fourth display color.

* * * * *